US008101671B2

(12) United States Patent
Kanae et al.

(10) Patent No.: US 8,101,671 B2
(45) Date of Patent: Jan. 24, 2012

(54) POLYOLEFIN RESIN FOAM AND THE PROCESS FOR PRODUCING THE SAME

(75) Inventors: Kentarou Kanae, Tokyo (JP); Norihiro Yamamoto, Tokyo (JP); Takio Itou, Ibaraki (JP); Yasuyuki Tokunaga, Ibaraki (JP); Makoto Saitou, Ibaraki (JP)

(73) Assignees: JSR Corporation, Tokyo (JP); Nitto Denko Corporation, Osaka (JP)

( * ) Notice: Subject to any disclaimer, the term of this patent is extended or adjusted under 35 U.S.C. 154(b) by 734 days.

(21) Appl. No.: 11/994,394

(22) PCT Filed: Mar. 30, 2007

(86) PCT No.: PCT/JP2007/057251
§ 371 (c)(1),
(2), (4) Date: Dec. 31, 2007

(87) PCT Pub. No.: WO2007/119625
PCT Pub. Date: Oct. 25, 2007

(65) Prior Publication Data
US 2009/0209670 A1     Aug. 20, 2009

(30) Foreign Application Priority Data

Mar. 30, 2006 (JP) ................................. 2006-095890
Feb. 5, 2007 (JP) ................................. 2007-026043

(51) Int. Cl.
*C08J 9/00* (2006.01)
*C08G 18/34* (2006.01)
(52) U.S. Cl. ............ 521/130; 521/79; 521/92; 521/131; 521/170
(58) Field of Classification Search ................ 521/97, 521/79, 92, 130, 131, 170, 174
See application file for complete search history.

(56) References Cited

U.S. PATENT DOCUMENTS 4,694,026 A * 9/1987 Park ................................. 521/94
(Continued)

FOREIGN PATENT DOCUMENTS

EP        0 976 782 A1    2/2000
(Continued)

OTHER PUBLICATIONS

Extended European Search Report issued Jun. 24, 2010 in counterpart European Application No. 07740687.4.

(Continued)

*Primary Examiner* — Randy Gulakowski
*Assistant Examiner* — Kara Negrelli
(74) *Attorney, Agent, or Firm* — Sughrue Mion, PLLC

(57) ABSTRACT

An object of the invention is to provide a polyolefin resin foam which is excellent in flexibility, cushioning property and processability, especially excellent in cutting processability. The present invention relates to a polyolefin resin foam obtained by foaming a polyolefin resin composition using carbon dioxide in a supercritical state, wherein the polyolefin resin composition contains at least: (1) a thermoplastic elastomer composition obtained by subjecting to a dynamically heat treatment a mixture of (A) a rubber, and (B) (B-1) an α-olefin crystalline thermoplastic resin and/or (B-2) an α-olefin amorphous thermoplastic resin, each having a melt tension of less than 3.0 cN at a temperature of 210° C. and at a take-up speed of 2.0 m/min, in the presence of (C) a crosslinking agent; (2) a polyolefin resin; and (3) a nucleant agent having an average particle diameter of from 0.1 μm to less than 2.0 μm. The polyolefin resin foam has a density, for example, of 0.2 g/cm² or less.

6 Claims, 1 Drawing Sheet

U.S. PATENT DOCUMENTS 6,849,667 B2 * 2/2005 Haseyama et al. ............ 521/170
2004/0162358 A1 * 8/2004 Yamamoto et al. ............ 521/79

FOREIGN PATENT DOCUMENTS

| JP | 54-120669 A | | 9/1979 |
|---|---|---|---|
| JP | 08-59876 A | | 3/1996 |
| JP | 09-296063 A | | 11/1997 |
| JP | 09-316251 A | | 12/1997 |
| JP | 11-147972 A | | 6/1999 |
| JP | 2001-348452 A | | 12/2001 |
| JP | 2001348452 A | * | 12/2001 |
| JP | 2002-47369 A | | 2/2002 |
| JP | 2003-268149 A | | 9/2003 |
| JP | 2004-250529 A | | 9/2004 |
| JP | 2005-68203 A | | 3/2005 |

OTHER PUBLICATIONS

Trial Board Decision dated Jun. 8, 2011 from the Korean Intellectual Property Office in counterpart Korean Patent Application No. 2007-7030771.

Chinese Office Action issued on Apr. 1, 2011 in the corresponding Chinese Patent Application No. 200780000660.8.

* cited by examiner

POLYOLEFIN RESIN FOAM AND THE PROCESS FOR PRODUCING THE SAME

TECHNICAL FIELD

The present invention relates to a polyolefin resin foam which is excellent in flexibility, cushioning property and processability and the process for producing the same.

BACKGROUND ART

A foam (foamed molded article) is used as an internal insulator of an electronic device and an information device, a cushioning material, a dust proofing material, a sound insulating material, a heat insulating material, a food packing material, a clothing material, a building material, and interior parts or exterior parts of an automobile and home electric appliances. Such a foam is required to have properties such as flexibility cushioning property and heat insulating property in view of securing a sealing property upon being incorporated as a part. As a material of the foam, resin foams based on a polyolefin such as polyethylene and polypropylene has been known. However, there has been a problem that these foams are insufficient in terms of flexibility and cushioning property. For solving such a problem, it has been employed to raise a foaming magnification or to incorporate a rubber ingredient or the like into a polyolefin resin to thereby soften the material itself. However, since ordinary polyethylene or polypropylene is weak in tensile strength at a high temperature, i.e., low in melt tension, when a foaming operation is conducted so as to obtain a high foaming magnification, cell wall collapses thereby causing gas escape and cell linking. Therefore, it has been difficult to obtain a soft foam having the desired high foaming magnification and high flexibility.

In order to solve the foregoing problems, JP-A-2004-250529 discloses a polyolefin resin foam produced by foammolding a composition for a polyolefin resin foam having a melt tension of 20 cN or more, which contains a polymer component composed of a polyolefin resin and a rubber and/or a thermoplastic olefin elastomer, and a powdery particle. However, there is still room for improvement on the foam obtained in terms of a flexibility, cushioning property and cutting processability.

Accompanied with recent miniaturization of an electronic device and an information device, a foam used as an internal insulator or cushioning material has been required to have a narrow width and a thin thickness. However, the conventional foam containing a polyolefin resin material has a large strain upon compression especially in a narrow processing width. For example, upon punching processing, cells in a punching site may collapse so that the shape of the foam is difficult to be recovered, to thereby cause the problems that the upper portion of the punching site becomes round or the thickness of the punching site (end) becomes thin.

Patent Document 1: JP-A-2004-250529

DISCLOSURE OF THE INVENTION

An object of the invention is to provide a polyolefin resin foam which is excellent in flexibility, cushioning property and processability, especially excellent in cutting processability; and a process for producing the same.

As a result of the intensive studies for achieving the above object, the present inventors found that, by foaming a polyolefin resin composition containing at least a thermoplastic elastomer composition obtained by a dynamically heat treatment of a mixture containing a rubber and an α-olefin thermoplastic resin having specified physical properties in the presence of a crosslinking agent; a polyolefin resin; and a nucleant agent having a specified particle size under specified conditions, it is possible to obtain a foam having excellent flexibility and cushioning property, in which cells in a punching site upon punching processing are difficult to collapse so that the shape of the foam is excellently recovered upon processing. The invention has been accomplished on these findings.

Namely, the invention provides:

a polyolefin resin foam obtained by foaming a polyolefin resin composition using carbon dioxide in a supercritical state, wherein the polyolefin resin composition comprises at least:

(1) a thermoplastic elastomer composition obtained by subjecting to a dynamically heat treatment a mixture of (A) a rubber, and (B) (B-1) an α-olefin crystalline thermoplastic resin and/or (B-2) an α-olefin amorphous thermoplastic resin, each having a melt tension of less than 3.0 cN at a temperature of 210° C. and at a take-up speed of 2.0 m/min, in the presence of (C) a crosslinking agent;

(2) a polyolefin resin; and (3) a nucleant agent having an average particle diameter of from 0.1 μm to less than 2.0 μm.

The foregoing polyolefin resin foam has a density of, e.g., 0.2 g/cm$^3$ or less. As the foregoing rubber (A), at least one kind selected from the group consisting of butadiene rubber, styrene-butadiene rubber, ethylene-α-olefin copolymer rubber, butyl rubber, isoprene rubber, acrylonitrile rubber and chloroprene rubber can be used. As the foregoing polyolefin resin (2), those having a melt tension of 3.0 cN or more at a temperature of 210° C. and at a take-up speed of 2.0 m/min can be used.

The foregoing polyolefin resin foam may be a polyolefin resin foam which is obtained by foaming the polyolefin resin composition using carbon dioxide in a supercritical state, in which the polyolefin resin composition further contains, in addition to the components (1) to (3), (4) at least one aliphatic compound selected from an aliphatic acid, an aliphatic acid amide and an aliphatic acid metallic soap, the compound having a polar functional group and having a melting point of 50 to 150° C.

The content of the foregoing aliphatic compound (4) is, e.g., from 1 to 5 parts by mass on 100 parts by mass of the sum of the components (1) and (2). As the foregoing aliphatic compound (4), an aliphatic acid and an aliphatic acid amide may be mentioned. Preferable examples of the aliphatic acid amide include erucamide.

The invention also provides:

a process for producing a polyolefin resin foam, which comprises foaming a polyolefin resin composition using carbon dioxide in a supercritical state, wherein the polyolefin resin composition comprises at least:

(1) a thermoplastic elastomer composition obtained by subjecting to a dynamically heat treatment a mixture of (A) a rubber, and (B) (B-1) an α-olefin crystalline thermoplastic resin and/or (B-2) an α-olefin amorphous thermoplastic resin, each having a melt tension of less than 3.0 cN at a temperature of 210° C. and at a take-up speed of 2.0 m/min, in the presence of (C) a crosslinking agent;

(2) a polyolefin resin; and (3) a nucleant agent having an average particle diameter of from 0.1 μm to less than 2.0 μm.

In the foregoing process for producing a polyolefin resin foam, a polyolefin resin composition which further contains, in addition to the components (1) to (3), (4) at least one aliphatic compound selected from an aliphatic acid, an aliphatic acid amide and an aliphatic acid metallic soap, in which the compound has a polar functional group and has a melting point of 50 to 150° C., may be foamed using carbon dioxide in a supercritical state.

The polyolefin resin foam of the present invention is not only excellent in flexibility and cushioning property, but also excellent in processability. Particularly, even when the polyolefin resin foam has a high foaming magnification, it hardly causes collapse of cells in a punching site upon punching processing, i.e., it has an excellent shape recovering property. Accordingly, a processing width can be extremely narrow and a thickness can be varied widely.

BEST MODE FOR CARRYING OUT THE INVENTION

Figure 1:
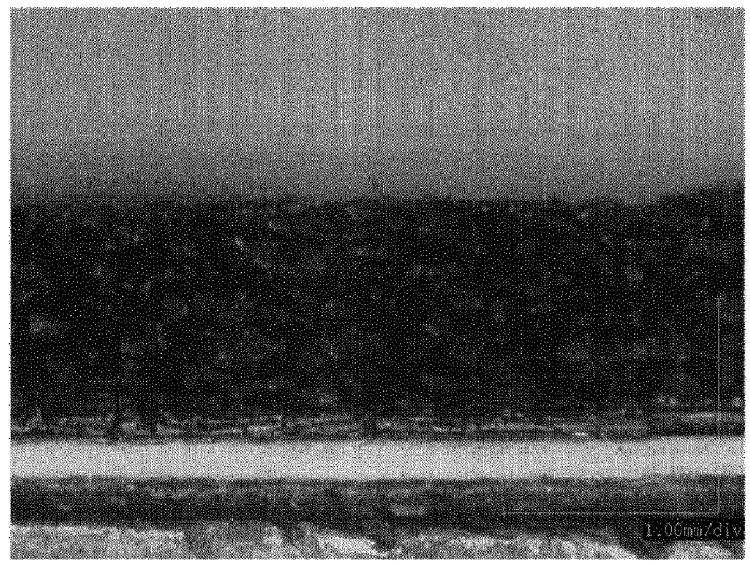
FIG. 1 is a digital microscopic photograph showing the state of a foam after punching in the case of the evaluation of "O" in the evaluation test of cutting processability in Examples.

The present invention will be described in detail below. It should be noted that in the present specification, all parts, percentages, and ratios defined by mass are the same as those defined by weight, respectively.

The polyolefin resin foam of the present invention is obtained by foaming a polyolefin resin composition using carbon dioxide in a supercritical state, in which the composition comprises at least a thermoplastic elastomer composition (1), a polyolefin resin (2), and a nucleant agent (3) having an average particle diameter of from 0.1 μm to less than 2.0 μm.

Thermoplastic Elastomer Composition (1)

The thermoplastic elastomer composition (1) is a composition which is obtained by subjecting to a dynamically heat treatment a mixture containing (A) a rubber, and (B) (B-1) an α-olefin crystalline thermoplastic resin and/or (B-2) an α-olefin amorphous thermoplastic resin, each having a melt tension of less than 3.0 cN at a temperature of 210° C. and at a take-up speed of 2.0 m/min in the presence of (C) a crosslinking agent.

Rubber (A)

As the rubber (A) (hereinafter, also sometimes referred to as component (A)), generally known various rubbers can be used. Specific examples of the component (A) include conjugated diene rubber such as butadiene rubber (BR) and isoprene rubber (IR), styrene-butadiene rubber (SBR), ethylene-α-olefin copolymer rubber, butyl rubber (IIR), acrylonitrile rubber (NBR) and chloroprene rubber (CR). They can be used alone or in combination thereof. Of these rubbers, conjugated diene rubber and ethylene-α-olefin copolymer rubber are preferable.

Conjugated Diene Rubber

The conjugated diene rubber is preferably obtained by polymerizing a conjugated-diene compound with a catalyst containing the following components (a) to (d) as main components. As the foregoing conjugated-diene compound, 1,3-butadiene and isoprene are preferable. It is preferable that the conjugated-diene compound has a 1,4-cis bond content of 90% or more and a ratio (Mw/Mn) of a weight-average molecular weight (Mw) with a number-average molecular weight (Mn) determined by gel permeation chromatography of 3.5 or less.

Component (a): A compound containing a rare earth element of an atomic number 57 to 71 of the Periodic Table, or a compound obtained by the reaction of the foregoing compound with a Lewis base (hereinafter, also referred to as (a) rare earth metal compound).

Component (b): Almoxane

Component (c): An organic aluminum compound corresponding to $AlR^1R^2R^3$ (in the formula, $R^1$ to $R^2$ are the same or different, and each represent a hydrocarbon group having 1 to 10 carbon atoms or a hydrogen atom. $R^3$ represents a hydrocarbon group having 1 to 10 carbon atoms, and $R^3$ may be the same as or different from the foregoing $R^1$ or $R^2$).

Component (d): A halogenated silicon compound and/or a halogenated organic silicon compound (hereinafter, also referred to as (d) silicon compound).

((a) Rare Earth Compound)

The component (a) is a compound containing a rare earth element of an atomic number 57 to 71 of the Periodic Table or a compound obtained by the reaction of the foregoing compound with a Lewis base. Examples of a preferable rare earth element include neodymium, praseodymium, cerium, lanthanum and gadlinium. Neodymium is more preferred. Two or more kinds of rare earth elements can be used. The rare earth element-containing compound is preferably a carboxylate, an alkoxide, a β-diketone complex, a phosphate or a phosphite. Of these compounds, a carboxylate or a phosphate is more preferred, and a carboxylate is especially preferred.

A carboxylate of a rare earth element is represented by, e.g., a general formula $(R^{23}-CO_2)_3M$ (in the formula, M represents a rare earth element of an atomic number 57 to 71 of the Periodic Table, $R^{23}$ represents a hydrocarbon group having 1 to 20 carbon atoms (preferably, saturated or unsaturated, and linear, branched or cyclic), and carboxyl group is bonded to a primary, secondary or tertiary carbon atom). Specifically, octanoic acid, 2-ethyl-hexanoic acid, oleic acid, stearic acid, benzoic acid, naphtenoic acid, and Versatic acid (trade name of Shell Chemicals, carboxylic acid in which the carboxyl group is bonded to a tertiary carbon atom) may be mentioned. Of these compounds, salts of 2-ethyl-hexanoic acid, naphtenoic acid, and Versatic acid are preferred.

An alkoxide of a rare earth element is represented by, e.g., a general formula $(R^{24}-O)_3M$ (in the formula, M represents a rare earth element of an atomic number 57 to 71 of the Periodic Table, $R^{24}$ represents a hydrocarbon group having 1 to 20 carbon atoms (preferably, saturated or unsaturated, and linear, branched or cyclic), and alkoxy group is bonded to a primary, secondary or tertiary carbon atom). Examples of the alkoxy group represented by "$R^{24}-O$" include a 2-ethyl-hexylalkoxy group, an oleylalkoxy group, a stearylalkoxy group, a phenoxy group and a benzylalkoxy group. Of these compounds, a 2-ethyl-hexylalkoxy group and a benzylalkoxy group are preferred.

As a β-diketone complex of a rare earth element, complexes of rare earth elements with an acetyl acetone, a benzoyl acetone, a propionyl acetone, a valeryl acetone or an ethylacetyl acetone may be mentioned Of these compounds an acetyl acetone complex and an ethylacetyl acetone complex are preferred.

As a phosphate or a phosphite of a rare earth element, rare earth element salts of bis(2-ethylhexyl)phosphate, bis(1-methylheptyl)phosphate, bis(p-nonylphenyl)phosphate, bis(polyethylene glycol-p-nonylphenyl)phosphate, (1-methylheptyl)(2-ethylhexyl)phosphate, (2-ethylhexyl)(p- nonylphenyl)phosphate, mono-2-ethylhexyl 2-ethylhexyl phosphonate, mono-p-nonylphenyl 2-ethylhexyl phosphonate, bis(2-ethylhexyl)phosphinic acid, bis(1-methylheptyl) phosphinic acid, bis(p-nonylphenyl)phosphinic acid, (1-methylheptyl)(2-ethylhexyl)phosphinic acid, and (2-ethylhexyl) (p-nonylphenyl)phosphinic acid may be mentioned. Of these compounds, rare earth element salts of bis(2-ethylhexyl) phosphate, bis(1-methylheptyl)phosphate, 2-ethylhexyl phosphonic acid mono-2-ethylhexyl and bis(2-ethylhexyl) phosphinic acid are preferred. Of the exemplifications described above, phosphates or carboxylates of neodymium are particularly preferred, and carboxylate of neodymium such as 2-ethyl-hexanoic acid salt of neodymium and Versatic acid salt of neodymium are most preferred.

A Lewis base used for readily solubilizing the foregoing rare earth element-containing compound is used in an amount of preferably from 0 to 30 mol, more preferably from 1 to 10 mol per 1 mol of the rare earth element-containing compound. It should be noted that the Lewis base is used as a mixture with a rare earth element-containing compound. As the Lewis base, acetyl acetone, tetrahydrofuran, pyridine, N,N-dimethylformamide, thiophene, diphenyl ether, triethylamine, organic phosphorus compounds and monovalent or divalent alcohols may be mentioned. The foregoing component (a) can be used alone or in combination thereof.

((b) Alumoxane)

The component (b) is a compound having a structure represented by the following formula (1) or (2), It can be an aggregate of an alumoxane disclosed in Fine Chemical, 23, (9), 5 (1994), J. Am. Chem. Soc., 115, 4971 (1993), J. Am. Chem. Soc., 117, 6465 (1995).

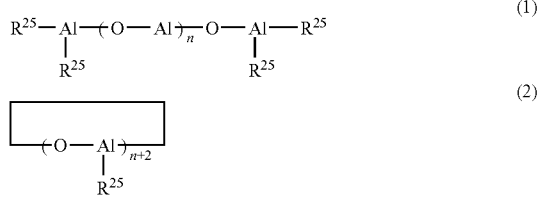

In the foregoing formulae (1) and (2), $R^{25}$ represents a hydrocarbon group having 1 to 20 carbon atoms, and n is an integer of 2 or more. Examples of $R^{25}$ include methyl, ethyl, propyl, butyl, isobutyl, t-butyl, hexyl, isohexyl, octyl, and isooctyl group. Of these, methyl, ethyl, isobutyl and t-butyl group are preferred. Methyl group is further preferred. Additionally, n is an integer of 2 or more, preferably from 4 to 100. Specific examples of the component (b) include methyl alumoxane, ethyl alumoxane, n-propyl alumoxane, n-butyl alumoxane, isobutyl alumoxane, t-butyl alumoxane, hexyl alumoxane and isohexyl alumoxane.

The component (b) can be one produced by any known technique. For example, it can be produced by adding a trialkyl aluminum or a dialkyl aluminum monochloride to an organic solvent such as benzene, toluene or xylene, and further adding water, vapor, vapor-containing nitrogen gas, or a salt containing crystal water such as cupper sulfate pentahydrate or aluminum sulfate hexadecahydrate thereto to thereby cause the reaction. The foregoing component (b) can be used alone or in combination thereof.

((c) Organic Aluminum Compound)

Examples of the component (c) include trimethyl aluminum, triethyl aluminum, tri-n-propyl aluminum, triisopropyl aluminum, tri-n-butyl aluminum, triisobutyl aluminum, tri-t-butyl aluminum, tripentyl aluminum, trihexyl aluminum, tricyclohexyl aluminum, trioctyl aluminum, hydrogenated diethyl aluminum, hydrogenated di-n-propyl aluminum, hydrogenated di-n-butyl aluminum, hydrogenated diisobutyl aluminum, hydrogenated dihexyl aluminum, hydrogenated diisohexyl aluminum, hydrogenated dioctyl aluminum, hydrogenated diisooctyl aluminum, ethylaluminum dihalide, n-propylaluminum dihalide, and isobutylaluminum dihalide. Of these compounds, triethyl aluminum, triisobutyl aluminum, hydrogenated diethyl aluminum, and hydrogenated diisobutyl aluminum are preferred. The component (c) can be used alone or in combination thereof.

((d) Silicon Compound)

The component (d) is a halogenated silicon compound and/or a halogenated organic silicon compound. As the halogenated silicon compound, for example, silicon tetrachloride, silicon tetrabromide, silicon tetraiodide and hexachlorodisilane may be mentioned.

Examples of the halogenated organic silicon compound include triphenylchlorosilane, trihexylchlorosilane, trioctylchlorosilane, tributylchlorosilane, triethylchlorosilane, trimethylchlorosilane, methylchlorosilane, trimethylbromosilane, diphenyldichlorosilane, dihexyldichlorosilane, dioctyldichlorosilane, dibutyldichlorosilane, diethyldichlorosilane, dimethyldichlorosilane, methyldichlorosilane, phenyltrichlorosilane, hexyltrichlorosilane, octyltrichlorosilane, butyltrichlorosilane, methyltrichlorosilane, ethyltrichlorosilane, vinyltrichlorosilane, trichlorosilane, tribromosilane, vinylmethyldichlorosilane, vinyldimethylchlorosilane, chloromethylsilane, chloromethyltrimethylsilane, chloromethyldimethylchlorosilane, chloromethylmethyldichlorosilane, chloromethyltrichlorosilane, dichloromethylsilane, dichloromethylmethyldichlorosilane, dichloromethyldimethylchlorosilane, dichlorotetramethyldisilane, tetrachlorodimethylsilanet bischlorodimethylsilylethane, dichlorotetramethyldisiloxane, trimethylsiloxydichlorosilane, trimethylsiloxydimethylchlorosilane, and tristrimethylsiloxydichlorosilane.

As the component (d), silicon tetrachloride, triethylchlorosilane, trimethylchlorosilane, diethyldichlorosilane, dimethyldichlorosilane, methyldichlorosilane, ethyltrichlorosilane, methyltrichlorosilane, trichlorosilane, dichlorotetramethyldisilane, and dichlorotetramethyldisiloxane are preferred. Silicon tetrachloride is further preferred. The foregoing component (d) can be used alone or in combination thereof.

The component (a) is used in an amount of preferably from 0.0001 to 1.0 mmol, more preferably from 0.0005 to 0.5 mmol per 100 g of a conjugated diene compound. When the amount thereof is less than 0.0001 mmol, polymerization activity tends to be decreased. While, when it exceeds 1.0 mmol, it is liable that a catalyst concentration may increase so that a decalcification process is required.

A use amount of the component (b) can be shown in terms of a molar ratio of Al to the component (a). The molar ratio of the component (a) and the component (b) is preferably from 1:1 to 1:500, more preferably from 1:3 to 1:250, and particularly preferably from 1:5 to 1:100. The molar ratio of the component (a) and the component (c) is preferably from 1:1 to 1:300, more preferably from 1:3 to 1:150. The molar ratio of the component (a) and the component (d) is preferably from 1:0.1 to 1:30, more preferably from 1:0.2 to 1:15.

When the amount of a catalyst or the ratios of components constituting a catalyst are outside the above-mentioned range, a catalyst cannot act as a highly active one or a process for eliminating a catalyst residue may be required in some cases. In addition to components (a) to (d), hydrogen gas can be coexistent in a polymerization in order to control a molecular weight of a polymer to be obtained.

As a catalyst component, in addition to components (a) to (d), a conjugated diene compound and/or an unconjugated diene compound can be optionally used in an amount of from 0 to 50 mol per 1 mol of the component (a). As the conjugated diene compound, 1,3-butadiene, isoprene or the like can be used as in the monomer for polymerization. As the nonconjugated diene compound, for example, divinyl benzene, diisopropenyl benzene, triisopropenyl benzene, 1,4-vinylhexadiene, ethylidenenorbornene or the like may be mentioned. As a catalyst component, it is not essential that a conjugated diene compound and an unconjugated diene compound are used together. However, the combination thereof is advantageous in further improving a catalyst activity.

A catalyst can be produced, for example, by reacting components (a) to (d) dissolved in a solvent and optionally a conjugated diene compound and/or an unconjugated diene compound. In the reaction, the order of adding respective components is optional. It should be noted that preferably respective components are preliminarily mixed, reacted and aged in view of improvement in a polymerization activity and shortening of a term for inducing polymerization initiation. The aging temperature is preferably from 0 to 100° C., more preferably from 20 to 80° C. When the temperature is less than 0° C., it is liable that sufficient aging cannot be achieved. On the other hand, when the temperature exceeds 100° C., the decrease in a catalytic activity or the broadening of a molecular weight distribution of a catalyst is liable to occur. The aging time is not particularly limited and components can be contacted with each other in a line prior to being added to a polymerization vessel. An aging time of 0.5 minutes or more is adequate and the resulting product is stable for several days.

As a conjugated diene compound which can be polymerized by using a catalyst containing components (a) to (d) as main components, 1,3-butadiene, 2-methyl-1,3-butadiene (isoprene), 2,3-dimethyl-1,3-butadiene, 1,3-pentadiene, 1,3-hexadiene, myrcene and the like may be mentioned. Of these compounds, 1,3-butadiene, isoprene and 1,3-pentadiene are preferred, and 1,3-butadiene is more preferred. These conjugated diene compound can be used alone or in combination thereof.

The conjugated diene rubber can be produced by polymerization using a solvent or without solvent. As a polymerization solvent, inert organic solvent can be used. As such an organic solvent, for example, saturated aliphatic hydrocarbons having 4 to 10 carbon atoms such as butane, pentane, hexane and heptane; saturated alicyclic hydrocarbons having 6 to 20 carbon atoms such as cyclopentane and cyclohexane; monoolefins such as 1-butene and 2-butene; aromatic hydrocarbons such as benzene, toluene and xylene; and halogenated hydrocarbons such as methylene chloride, chloroform, carbon tetrachloride, trichloroethylene, perchloroethylene, 1,2-dichloroethane, chlorobenzene, bromobenzene and chlorotoluene may be mentioned.

The polymerization temperature is usually, from −30° C. to +200° C., preferably from 0 to +150° C. The polymerization reaction can be batch-wise or continuous manner. In a case where a polymerization solvent is used, a monomer concentration in the solvent is usually from 5 to 50% by mass, preferably from 7 to 35% by mass. In the production of a polymer, in order not to deactivate a catalyst or a polymer, it is preferable to take care so as not to incorporate a compound having a deactivation function such as oxygen, water or carbonic acid gas into a reaction system as much as possible.

When a catalyst containing components (a) to (d) as main components is used, a conjugated diene rubber having a high 1,4-cis bond content and a sharp molecular weight distribution can be obtained. A 1,4-cis bond content of a conjugated diene rubber obtained by using a catalyst containing components (a) to (d) as main components is usually 90% or more, preferably 92% or more. Further, 1,2-vinyl bond content of a conjugated diene rubber is usually 2.5% or less, preferably 2.0% or less. When these ranges are outside the above-mentioned range, mechanical and physical properties and rubber elasticity of the rubber are liable to be decreased. It should be noted is that a micro structure such as the 1,4-cis bond content of a conjugated diene rubber can be readily adjusted by controlling the composition ratio of a catalyst and a polymerization temperature.

Mw/Mn, i.e., a ratio of a weight-average molecular weight (Mw) with a number-average molecular weight (Mn), is preferably 3.5 or less, more preferably 3.3 or less. When it exceeds 3.5, the rubber elasticity is liable to be decreased. Mw/Mn can be readily adjusted by controlling a molar ratio of components (a) to (d). The Mooney viscosity of a conjugated diene rubber ($ML_{1+4}$, 100° C.) is preferably from 10 to 100, more preferably from 15 to 90. When it is less than 10, the mechanical and physical properties and the rubber elasticity of a thermoplastic elastomer composition are liable to be decreased. On the other hand, when it exceeds 100, processability thereof upon dynamically crosslinking is liable to be decreased, The molecular weight of a conjugated diene rubber can be varied widely. The weight-average molecular weight (Mw) of a conjugated diene rubber on a polystyrene conversion determined by GPC is usually from 50,000 to 1,500,000, preferably from 100,000 to 1,000,000. When it is less than 50,000, the mechanical and physical properties and the rubber elasticity of a thermoplastic elastomer composition are liable to be decreased. On the other hand, when it exceeds 1,500,000, processability thereof upon dynamically crosslinking is liable to be decreased.

A desired conjugated diene rubber can be recovered from a polymerization reaction system by effecting a drying procedure using a known solvent elimination agent in the production of a conjugated diene rubber with optionally adding a polymerization terminator or a polymer stabilizer to the polymerization reaction system.

It is preferable that a conjugated diene compound is polymerized by using the foregoing catalyst, successively the active end of the resulting polymer is reacted with at least one compound selected from the group consisting of the following components (e) to (k) (hereinafter, also referred to as "modification"). According to this reaction, a polymer having an increased molecular weight or having a branched chain can be obtained. Further, by this modification, the physical properties and the rubber elasticity of a thermoplastic elastomer composition are improved.

Component (e): A halogenated organic metal compound, a halogenated metal compound, or an organic metal compound, corresponding to $R^4_n M'X_{4-n}$, $M'X_4$, $M'X_3$, $R^4_n M'(-R^5 COOR^6)_{4-n}$, or $R^4_n M'(-R^5 COR^6)_{4-n}$, (in which $R^4$ and $R^5$ may be the same or different and each represent a hydrocarbon group having 1 to 20 carbon atoms; $R^6$ represent a hydrocarbon group having 1 to 20 carbon atoms which may contain a carbonyl group or an ester group in the side chain thereof; M' represents a tin atom, silicon atom, germanium atom or phosphorous atom; X represents a halogen atom; and n is an integer of from 0 to 3).

Component (f): A heterocumulene compound having a Y=C=Z bond in the molecule thereof (in which Y represents a carbon atom, oxygen atom, nitrogen atom or sulfur atom; Z represents an oxygen atom, nitrogen atom or sulfur atom).

Component (g): A hetero three-membered cyclic compound having a bond represented by the following formula (3) in the molecule thereof (in which Y' represents an oxygen atom, nitrogen atom or sulfur atom).

(3)

Component (h): A halogenated isocyano compound.
Component (i): A carboxylic acid, an acid halide, an ester compound, a carbonic ester compound or an acid ahydride corresponding to $R^7-(COOH)_m$, $R^8(COX)_m$, $R^9-(COO-R^{10})$, $R^{11}-OCOO-R^{12}$, $R^{13}-(COOCO-R^{14})_m$, or the following formula (4) (in which $R^7$ to $R^{15}$ may be the same or different and each represent a hydrocarbon group having 1 to 50 carbon atoms; X represents a halogen atom; and m is an integer of from 1 to 5).

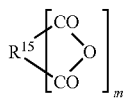
(4)

Component (j): A metal salt of carboxylic acid corresponding to $R^{16}{}_lM''(OCOR^{17})_{4-l}$, $R^{18}{}_lM''(OCO-R^{19}-COOR^{20})_{4-l}$, or the following formula (5) (in which $R^{16}$ to $R^{22}$ may be the same or different and represent a hydrocarbon group having 1 to 20 carbon atoms; M'' represents a tin atom, silicon atom or germanium atom; and l is an integer of form 0 to 3).

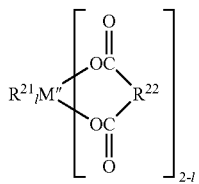
(5)

Component (k); A compound having an alkoxysilyl group.
Examples of the component (e) in which M' represents a tin atom include triphenyl tinchloride, tributyl tinchloride, triisopropyl tinchloride, trihexyl tinchloride, trioctyl tinchloride, diphenyl tindichloride, dibutyl tindichloride, dihexyl tindichloride, dioctyl tindichloride, phenyl tintrichloride, butyl tintrichloride, octyl tintrichloride, and tin tetrachloride.

Examples of the component (e) in which M' represents a silicon atom include triphenyl chlorosilane, trihexyl chlorosilane, trioctyl chlorosilane, tributyl chlorosilane, trimethyl chlorosilane, diphenyl dichlorosilane, dihexyl dichlorosilane, dioctyl dichlorosilane, dibutyl dichlorosilane, dimethyl dichlorosilane, phenyl trichlorosilane, hexyl trichlorosilane, octyl trichlorosilane, butyl trichlorosilane, methyl trichlorosilane, and silicon tetrachloride.

Examples of the component (e) in which M' represents a germanium atom include triphenyl germanium chloride, dibutyl germanium dichloride, diphenyl germanium dichloride, butyl germanium trichloride and germanium tetrachloride. In the component (e), as those wherein M' represents phosphorus atom, for example, mention may be made phosphorus trichloride. These components (e) can be used together in any ratio.

Of components (f), the compound in which Y represents a carbon atom and Z represents an oxygen atom is a ketene compound and the compound in which Y represents carbon atom and z represents sulfur atom is a thioketene compound. While the compound in which Y represents nitrogen atom and Z represents oxygen atom is an isocyanate compound and the compound in which Y represents nitrogen atom and Z represents sulfur atom is a thioisocyanate compound. Further, the compound in which Y and Z represent nitrogen atom is a carbodiimide compound, the compound in which Y and Z represent oxygen atom is carbon dioxide, the compound in which Y represents oxygen atom and Z represents sulfur atom is carbonyl sulfide, and the compound in which Y and Z represent sulfur atom is carbon disulfide. However, the component (f) is never limited to these exemplifications.

Examples of the ketene compound include ethyl ketene, butyl ketene, phenyl ketene and toluoyl ketene. Examples of the thioketene compound include ethylene thioketene, butyl thioketene, phenyl thioketene and toluoyl thioketene. Examples of the isocyanate compound include phenyl isocyanate, 2,4-tolylene diisocyanate, 2,6-tolylene diisocyanate, diphenylmethane diisocyanate, a polymeric type diphenylmethane diisocyanate and hexamethylene diisocyanate. Examples of the thioisocyanate compound include phenyl thioisocyanate, 2,4-tolylene dithioisocyanate and hexamethylene dithioisocyanate. Examples of the carbodiimide compound include N,N'-diphenyl carbodiimide and N,N'-ethyl carbodiimide.

Of components (g), the compound in which Y' represents an oxygen atom is an epoxy compound, the compound in which Y' represents a nitrogen atom is an ethylene imine derivative, and the compound in which Y' represents a sulfur atom is a thiirane compound. Examples of the epoxy compound include ethylene oxide, propylene oxide, cyclohexene oxide, styrene oxide, epoxidized soybean oil and epoxidized natural rubber. Examples of the ethylene imine derivative include ethylene imine, propylene imine, N-phenylethylene imine and N-(β-cyanoethyl)ethylene imine. Further, examples of the thiirane compound include a thiirane, methyl thiirane and phenyl thiirane.

The halogenated isocyano compound which is the component (h) is a compound having a structure represented by the following formula (6):

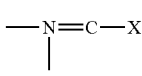
(6)

Examples of the halogenated cyano compound include 2-amino-6-chloropyridine, 2,5-dibromopyridine, 4-chloro-2-phenylquinazoline, 2,4,5-tribromoimidazole, 3,6-dichloro-4-methylpyridazine, 3,4,5-trichloropyridazine, 4-amino-6-chloro-2-mercaptopyrimidine, 2-amino-4-chloro-6-methylpyrimidine, 2-amino-4,6-dichloropyrimidine, 6-chloro-2,4-dimethoxypyrimidine, 2-chloropyrimidine, 2,4-dichloro-6-methylpyrimidine, 4,6-dichloro-2-(methylthio)pyrimidine, 2,4,5,6-tetrachloropyrimidine, 2,4,6-trichloropyrimidine, 2-amino-6-chloropyrazine, 2,6-dichloropyrazine, 2,4-bis(methylthio)-6-chloro-1,3,5- triazine, 2,4,6-trichloro-1,3,5-triazine, 2-bromo-5-nitrothiazole, 2-chlorobenzothiazole and 2-chlorobenzooxazole.

Of the component (i), examples of the carboxylic acid include acetic acid, stearic acid, adipic acid, maleic acid, benzoic acid, acrylic acid, methacrylic acid, phthalic acid, isophthalic acid, terephthalic acid, trimeritic acid, pyromeritic acid, meritic acid, and hydrolyzed products or partially hydrolyzed products of a polymethacrylic acid ester compound or a polyacrylic acid compound.

Of components (i), examples of the acid halide include acetic acid chloride, propionic acid chloride, butanoic acid chloride, isobutanoic acid chloride, octanoic acid chloride, acryric acid chloride, benzoic acid chloride, stearic acid chloride, phthalic acid chloride, maleic acid chloride, oxa-phosphoric acid chloride, acetyl iodide, bonzoyl iodide, acetyl fluoride and benzoyl fluoride.

Of components (i), examples of the ester compound include ethyl acetate, ethyl stearate, diethyl adipate, diethyl maleate, methyl benzoate, ethyl acrylate, ethyl methacrylate, diethyl phthalate, dimethyl terephthalate, tributyl trimeritate, tetraoctyl pyromeritate, hexaethyl meritate, phenyl acetate, polymethyl methacrylate, polyethyl acrylate, and polyisobutyl acrylate. Examples of the carbonic acid ester compound include dimethyl carbonate, diethyl carbonate, dipropyl carbonate, dihexyl carbonate, and diphenyl carbonate.

Of components (i), examples of the acid anhydride include intermolecular acid anhydrides such as acetic anhydride, propionic anhydride, isobutyric anhydride, isovaleric anhydride, heptanoic anhydride, benzoic anhydride, and cinnamic anhydride; and intramolecular acid anhydrides represented by the foregoing formula (5) such as succinic anhydride, methyl succinic anhydride, maleic anhydride, glutaric anhydride, citraconic anhydride, phthalic anhydride, and styrene-maleic anhydride copolymer.

It should be noted that compounds exemplified as the component (i) may contain in the molecule thereof, for example, an aprotic polar group such as an ether group or a tertiary amino group so long as the object of the present invention is not impaired. The component (i) can be used alone or in any mixture thereof. Further, the component (i) may contain a compound containing a free alcoholic group or phenolic group as an impurity.

Of the components (j), as those represented by "$R^{16}_l M''(OCOR^{17})_{4-l}$", for example, mention may be made of triphenyl tinlaurate, triphenyl tin-2-ethylhexatate, triphenyl tinnaphthate, triphenyl tinacetate, triphenyl tinacrylate, tri-n-butyl tinlaurate, tri-n-butyltin-2-ethylhexatate, tri-n-butyl tinnaphthate, tri-n-butyl tinacetate, tri-n-butyl tinacrylate, tri-t-butyl tinlaurate, tri-t-butyltin-2-ethylhexatate, tri-t-butyl tinnaphthate, tri-t-butyl tinacetate, tri-t-butyl tinacryate, triisobutyl tinlaurate, triisobutyltin-2-ethylhexatate, triisobutyl tinnaphthate, triisobutyl tinacetate, triisobutyl tinacrylate, triisopropyl tinlaurate, triisopropyltin-2-ethylhexatate, triisopropyl tinnaphthate, triisopropyl tinacetate, triisopropyl tinacryate, trihexyl tinlaurate, trihexyltin-2-ethylhexatate, trihexyl tinacetate, trihexyl tinacrylate, trioctyl tinlaurate, trioctyltin-2-ethylhexatate, trioctyl tinnaphthate, trioctyl tinacetate, trioctyl tinacrylate, tri-2-ethylhexyl tinlaurate, tri-2-ethylhexyl tin-2-ethylhexatate, tri-2-ethylhexyl tinnaphthate, tri-2-ethylhexyl tinacetate, tri-2-ethylhexyl tinacrylate, tristearyl tinlaurate, tristearyltin-2-ethylhexatate, tristearyl tinnaphthate, tristearyl tinacetate, tristearyl tinacrylate, tribenzyl tinlaurate, tribenzyltin-2-ethylhexatate, tribenzyl tinnaphthate, tribenzyl tinacetate, and tribenzyl tinacrylate which are represented by the foregoing formula in which l is 3, and those corresponding to these compounds in which l is 2 or l is 1.

Of the components (j), as those represented by "$R^{18}_l M''(OCO-R^{19}-COOR^{20})_{4-l}$", for example, mention may be made of maleic acid ester salt compounds such as diphenyltin bismethylmaleate, diphenyltinbis-2-ethylhexylmaleate, diphenyltin bisoctylmaleate, diphenyltin bisbenzylmaleate, di-n-butyltin bismethylmaleate, di-n-butyltinbis-2-ethylhexylmaleate, di-n-butyltin bisoctylmaleate, di-n-butyltin bisbenzylmaleate, di-t-butyltin bismethylmaleate, di-t-butyltin bis-2-ethylhexylmaleate, di-t-butyltin bisoctylmaleate, di-t-butyltin bisbenzylmaleate, diisobutyltin bismethylmaleate, diisobutyltin bis-2-ethylhexylmaleate, diisobutyltin bisoctylmaleate, diisobutyltin bisbenzylmaleate, diisopropyltin bismethylmaleate, diisopropyltin bis-2-ethylhexylmaleate, diisopropyltin bisoctylmaleate, diisopropyltin bisbenzylmaleate, dihexyltin bismethylmaleate, dihexyltin bis-2-ethylhexylmaleate, dihexyltin bisoctylmaleate, dihexyltin bisbenzylmaleate, di-2-ethylhexyltin bismethylmaleate, di-2-ethylhexyltin bis-2-ethylhexylmaleate, di-2-ethylhexyltin bisoctylmaleate, di-2-ethylhexyltin bisbenzylmaleate, dioctyltin bismethylmaleate, dioctyltin bis-2-ethylhexylmaleate, dioctyltin bisoctylmaleate, dioctyltin bisbenzylmaleate, distearyltin bismethylmaleate, distearyltin bis-2-ethylhexylmaleate, distearyltin bisoctylmaleate, distearyltin bisbenzylmaleate, dibenzyltin bismethylmaleate, dibenzyltin bis-2-ethylhexylmaleate, dibenzyltin bisoctylmaleate, and dibenzyltinbis benzylmaleate; and adipic ester salt compounds corresponding to these compounds.

Of the components (j), as those represented by the foregoing formula (5), diphenyltin maleate, di-n-butyltin maleate, di-t-butyltin maleate, diisobutyltin maleate, diisopropyltin maleate, dihexyltin maleate, di-2-ethylhexyltin maleate, dioctyltin maleate, distearyltin maleate, dibenzyltin maleate, diphenyltin diaditate, di-n-butyltin aditate, di-t-butyltin aditate, diisobutyltin aditate, diisopropyltin aditate, dihexsyltin aditate, di-2-ethylhexyltin aditate, dioctyltin aditate, distearyltin aditate and dibenzyltin aditate may be mentioned.

As the component (k), an alkoxysilane compound having at least one epoxy group and/or isocyanate group in the molecule thereof can be suitably used. Specific examples of the component (k) include epoxy group-containing alkoxysilanes such as (3-glycidyloxypropyl)trimethoxysilane, (3-glycidyloxypropyl)triethoxysilane, (3-glycidyloxypropyl)methyldimethoxysilane, (3-glycidyloxypropyl)methyldiethoxysilane, β-(3,4-epoxycyclohexyl)trimethoxysilane, β-(3,4-epoxycyclohexyl)triethoxysilane, β-(3,4-epoxycyclohexyl)methyldimethoxysilane, β-(3,4-epoxycyclohexyl)ethyldimethoxysilane, a condensate of (3-glycidyloxypropyl)trimethoxysilane, and a condensate of (3-glycidyloxypropyl)methyldimethoxysilane; and isocyanate group-containing alkoxysilanes such as 3-isocyanatepropyltrimethoxysilane, 3-isocyanatepropyltrimethoxysilane, (3-isocyanatepropyl)methyldimethoxysilane, (3-isocyanatepropyl)methyldiethoxysilane, a condensate of 3-isocyanatepropyltrimethoxysilane, and a condensate of (3-isocyanatepropyl)methyldimethoxysilane.

Upon reacting the component (k) with the active end of a polymer, a Lewis acid can be added to a reaction system for accelerating the reaction. A Lewis acid acts as a catalyst to accelerate a coupling reaction, whereby a cold flow of a modified polymer is improved to give an improved storage stability, which is preferable. Specific examples of the Lewis acid include dibutyltin laurate, dioctyltin laurate, dibutyltin bis-2-ethylhexyl maleate alkyl maleate, dioctyltin bis-2-ethylhexyl maleate and aluminum triisoporpoxide.

Components (e) to (k) (hereinafter, also referred to as "modifier") can be used alone or in combination thereof. A modifier is preferably used in an amount of from 0.01 to 200, more preferably from 0.1 to 150 to the amount of the component (a) in terms of molar ratio. When the amount thereof is less than 0.01, a reaction is liable to proceed inadequately and effects in improving mechanical and physical properties and rubber elasticity are liable to be exhibited with difficulty. On the other hand, when it exceeds 200, the physical property improving effects are not increased any more. Thus, an amount exceeding 200 is not preferable from the economical aspect. Further, it may sometimes occur that a toluene insoluble matter (gel) is liable to be generated.

A modification reaction is preferably performed at a temperature of 160° C. or less, preferably from −30 to 130° C. with stirring for preferably from 0.1 to 10 hours, more preferably from 0.2 to 5 hours. The desired polymer can be recovered after completion of the modification reaction by deactivating a catalyst, optionally adding a polymer stabilizer to a reaction system, followed by effecting a solvent elimination procedure and a drying procedure which are known in the production of a conjugated diene polymer.

(Ethylene-α-olefin Copolymer Rubber)

An ethylene-α-olefin copolymer rubber is not particularly limited so long as it contains a constituent unit (a1) derived from ethylene and a constituent unit (a2) derived from an α-olefin. Accordingly, the ethylene-α-olefin copolymer rubber can be not only a binary copolymer containing the constituent unit (a1) and the constituent unit (a2), but also can be a ternary copolymer containing these components (a1) and (a2) and a constituent unit (a3) derived from another monomer. Further, it also can be a multicomponent copolymer containing four or more constituent units so long as it contains components (a1) and (a2). It should be noted that the ethylene-α-olefin copolymer rubber can be used alone or in combination thereof.

A proportion of the constituent unit (a1) included in an ethylene-α-olefin copolymer rubber is preferably 35 mol % or more based on 100 mol % of the entire constituent units. When the proportion of the constituent unit (a1) is less than 35 mol %, the resulting copolymer rubber is liable to be insufficient in mechanical strength. On the other hand, when the proportion of the constituent unit (a1) is excessively large, the resulting copolymer rubber is liable to be insufficient in flexibility. Accordingly, the proportion of the constituent unit (a1) included in an ethylene-α-olefin copolymer rubber is more preferably from 40 to 90 mol %, especially preferably from 45 to 85 mol %, based on 100 mol % of the entire constituent units.

Specific examples of an α-olefin constituting the constituent unit (a2) include propylene, 1-butene, 2-butene, isobutene, 1-pentene, 2-methyl-1-butene, 2-methyl-2-butene, 3-methylbutene, 1-hexene, 4-methyl-1-pentene, 3-methyl-1-pentene, 1-heptene, 1-octene, 1-decene, and 1-undecene. In particular, propylene, 1-butene and 1-octene are preferred. These α-olefins can be used alone or in combination thereof.

A proportion of the constituent unit (a2) included in an ethylene-α-olefin copolymer rubber is preferably from 5 to 65 mol %, more preferably from 10 to 45 mol %, and especially preferably from 15 to 40 mol %, based on 100 mol % of the entire constituent units. When the proportion of the constituent unit (a2) is less than 5 mol %, the resulting copolymer rubber is liable to be difficult in exhibiting a desired rubber elasticity. On the other hand, when the proportion of the constituent unit (a2) exceeds 65 mol %, the resulting copolymer rubber is liable to have a decreased durability.

In a case where an ethylene-α-olefin copolymer rubber contains the constituent unit (a3), as a monomer constituting this constituent unit (a3), a nonconjugated diene compound can be mentioned. Specific examples of the nonconjugated diene compound include linear acyclic diene compounds such as 1,4-hexadiene, 1,5-hexadiene and 1,6-hexadiene; branched acyclic linear diene compounds such as 5-methyl-1,4-hexadiene, 3,7-dimethyl-1,6-octadiene, 5,7-dimethylocta-1,6-diene, 3,7-dimethyl-1,7-octadiene, 7-methylocta-1,6-diene and dihydromylcene; and alicyclic diene compounds such as tetrahydroindene, methyltetrahydroindene, dicyclopentadiene, bicyclo[2,2,1]-hepta-2,5-diene, 5-methylene-2-norbornene, 5-ethylidene-2-norbornene, 5-propenyl-2-norbornene, 5-isopropylidene-2-norbornene, 5-cyclohexylidene-2-norbornene and 5-vinyl-2-norbornene. In particular, 1,4-hexadiene, dicyclopentadiene and S-ethylidene-2-norbornene are preferred. These nonconjugated diene compounds can be used alone or in combination thereof.

In a case where an ethylene-α-olefin copolymer rubber contains the constituent unit (a3), a proportion of the constituent unit (a3) included in an ethylene-α-olefin copolymer rubber is preferably 15 mol % or less, more preferably from 1 to 12 mol %, based on 100 mol % of the entire constituent units. When the proportion of the constituent unit (3) exceeds 15 mol %, the resulting copolymer rubber is liable to have a decreased durability.

As the ethylene-α-olefin copolymer rubber, halogenated copolymers obtained by partially substituting hydrogen atom in the molecule of the ethylene-α-olefin copolymer rubber described above with a halogen atom such as a chorine atom or bromine atom, can be used.

Further, as the ethylene-α-olefin copolymer rubber, a graft polymer obtained by polymerizing the foregoing the ethylene-α-olefin copolymer rubber with an unsaturated monomer can be used. As the unsaturated monomer, vinyl chloride; vinyl acetate; (meth)acrylic acid; (meth)acrylic acid derivatives such as methyl(meth)acrylate, glycidyl(meth)acrylate and (meth)acrylamide; maleic acid; maleic acid derivatives such as maleic anhydride, maleimide and dimethyl maleate; and conjugated diene compounds such as butadiene, isoprene and chloroprene may be mentioned.

The crystallinity of an ethylene-α-olefin copolymer rubber determined by X-ray diffraction is preferably 20% or less, more preferably 15% or less. When the crystallinity of an ethylene-α-olefin copolymer rubber exceeds 20%, the rubber is liable to have a decreased flexibility.

An ethylene-α-olefin copolymer rubber can be obtained, for example, by a medium low pressure polymerization method, for example, a method including polymerizing an ethylene-α-olefin and a non-conjugated diene compound in the presence of a catalyst containing a solvent including Ziegler-Natta catalyst, a soluble vanadium compound and an organic aluminum compound, optionally with supplying hydrogen as a molecular weight control agent. The polymerization can be effected according to a gaseous phase method (fluidized bed or stirred bed) or a liquid phase method (slurry method or solution method).

As the foregoing soluble vanadium compound, for example, a reaction product of at least one of $VOCl_3$ and $VOCl_4$ with an alcohol can be preferably used. As the alcohol, methanol, ethanol, n-propanol, isopropyl alcohol, n-butanol, sec-butyl alcohol, t-butyl alcohol, n-hexanol, n-octanol, 2-ethyl hexanol, n-decanol, n-dodecanol and the like can be used. Of these alcohols, those having 3 to 8 carbon atoms can be preferably used.

As the foregoing organic aluminum compound, triethyl aluminum, triisobutyl aluminum, tri-n-hexyl aluminum, diethylaluminum monochloride, diisobutylaluminum monochloride, ethylaluminum sesquichloride, butylaluminum sesquichloride, ethylaluminum dichloride, butylaluminum dichloride, a methylaluminoxane which is a reaction product of trimethyl aluminum and water may be mentioned. Of these compounds, particularly, ethylaluminum sesquichloride, butylaluminum sesquichloride, a mixture of ethylaluminum sesquichloride and triisobutyl aluminum, and a mixture of triisobutyl aluminum and butylaluminum sesquichloride are preferably used.

As the foregoing solvent, a hydrocarbon is preferably used. Of the solvents, particularly, n-pentane, n-hexane, n-octane, isooctane and cyclohexane are preferably used. They can be used alone or in combination thereof.

As an ethylene-α-olefin copolymer rubber, an oil-extended rubber obtained by adding a mineral oil softener to the ethylene-α-olefin copolymer rubber as described above can be used. Such an oil-extended rubber can be readily handled. Accordingly, when an oil-extended rubber is used as the ethylene-α-olefin copolymer rubber, a thermoplastic elastomer composition can be readily produced, which is preferable. A proportion of the ethylene-α-olefin copolymer rubber to be included in the oil-extended rubber is preferably from 20 to 80% by mass, more preferably from 25 to 75% by mass, and particularly preferably from 30 to 70% by mass, based on 100% by mass of the entire oil-extended rubber.

The intrinsic viscosity of an ethylene-α-olefin copolymer rubber (determined in Decalin at 135° C.) is preferably 1.0 dl/g or more. When the intrinsic viscosity of the ethylene-α-olefin copolymer rubber is less than 1.0 dl/g, for example, in using the foregoing oil-extended rubber as the ethylene-α-olefin copolymer rubber, a mineral oil softener bleeds out from a thermoplastic elestomer composition so that the composition is liable to have a decreased rubber elasticity. On the other hand, when the ethylene-α-olefin copolymer rubber has an excessively high intrinsic viscosity, the molding processability of the composition is liable to be decreased. Accordingly, the intrinsic viscosity of the ethylene-α-olefin copolymer rubber is more preferably from 2.0 to 7.0 gl/g, and further preferably from 3.0 to 6.0 dl/g.

In the present invention, as the component (A), it is particularly preferable to use an ethylene-α-olefin copolymer rubber alone or a combination of a conjugated diene rubber and an ethylene-α-olefin copolymer rubber. In a case where a conjugated diene rubber is used in combination with an ethylene-α-olefin copolymer rubber, the ratio between them is as follows. For example, the is former/the latter (mass ratio) is around 1/99 to 99/1, preferably 10/90 to 90/10, more preferably 20/80 to 80/20. α-olefin thermoplastic resin (B)

The thermoplastic elastomer composition in the present invention contains (B-1) an α-olefin crystalline thermoplastic resin and/or (B-2) an α-olefin amorphous thermoplastic resin, each having a melt tension of less than 3.0 cN at a temperature of 210° C. and at a take-up speed of 2.0 m/min (these are sometimes referred to as α-olefin thermoplastic resin (B) and they are also referred to as component (B)).

The α-olefin crystalline thermoplastic resin (B-1) is not particularly limited so long as it is a crystalline resin containing an α-olefin as a main monomer. It can be a homopolymer of an α-olefin or a copolymer of an α-olefin with another monomer. Further, it can be a mixture of two or more kinds of different homopolymers and/or copolymers as described above. The α-olefin crystalline thermoplastic resin (B-1) preferably contains an α-olefin in an amount of 80 mol % or more, preferably 90 mol % or more based on the entire monomer-constituting units.

As an α-olefin constituting the α-olefin crystalline thermoplastic resin (B-1), an α-olefin having 2 to 12 carbon atoms such as ethylene, propene(propylene), 1-butene, 1-pentene, 3-methyl-1-butene, 1-hexene, 3-methyl-1-pentene, 4-methyl-1-pentene, 3-ethyl-1-pentene, 1-octene, 1-decene and 1-undecene may be mentioned. They can be used alone or in combination thereof.

In a case where the α-olefin crystalline thermoplastic resin (B-1) is a copolymer, it can be either a random copolymer or a block copolymer. In the random copolymer, in order to have crystallinity, the total amount of constituent units except for an α-olefin is preferably 15 mol % or less (more preferably 10 mol % or less) based on 100 mol % of the entire amount of the random copolymer. On the other hand, in the block copolymer, the total amount of constituent units except for an α-olefin is preferably 40 mol % or less (more preferably 20 mol % or less) based on 100 mol % of the entire amount of the block copolymer.

On the other hand, the α-olefin amorphous thermoplastic resin (B-2) is not particularly limited so long as it is an amorphous resin containing an α-olefin as a main monomer. It can be a homopolymer of an α-olefin or a copolymer of an α-olefin with another monomer. Further, it can be a mixture of two or more kinds of different homopolymers and/or copolymers as described above. The α-olefin amorphous thermoplastic resin (B-2) preferably contains an α-olefin in an amount of 50 mol % or more (more preferably 60 mol % or more) based on the entire monomer-constituting units.

As an α-olefin which constitutes the α-olefin amorphous thermoplastic resin (B-2), an α-olefin having 3 or more carbon atoms is preferably used, As in the foregoing exemplification in the α-olefin crystalline thermoplastic resin (B-1), an α-olefin having 3 to 12 carbon atoms can be preferably used.

As the α-olefin amorphous thermoplastic resin (B-2), homopolymers such as atactic polypropylene and atactic poly-1-butene; copolymers of propylene (included in an amount of 50 mol % or more) with other α-olefins such as ethylene, 1-butene, 1-pentene, 1-hexene, 4-methyl-1-pentene, 1-octene and 1-decene; and copolymers of 1-butene (included in an amount of 50 mol % or more) with other α-olefins such as ethylene, propylene, 1-pentene, 1-hexene, 4-methyl-1-pentene, 1-octene and 1-decene) may be mentioned.

In a case where the α-olefin amorphous thermoplastic resin (B-2) is a copolymer, it can be either a random copolymer or a block copolymer. In the block copolymer, however, an α-olefin unit to be a main component (propylene, 1-butene in the foregoing copolymer) is required to be bonded in terms of an atactic structure. When the foregoing α-olefin amorphous thermoplastic resin (B-2) is a copolymer of an α-olefin having 3 or more carbon atoms with ethylene, the content of the α-olefin is preferably 50 mol % or more (more preferably from 60 to 100 mol %) based on 100 mol % of the entire copolymer.

The α-olefin thermoplastic resin (B) has a melt tension of less than 3.0 cN at a temperature of 210° C. and at a take-up speed of 2.0 m/min (for example, 0.1 cN or more but less than 3.0 cN, preferably from 0.2 cN to 2.5 cN). When this melt tension exceeds 3.0 cN, a thermoplastic resin composition having a desirable sea-island structure formed therein unpreferably cannot be obtained.

A combination of one or two or more kinds of the foregoing α-olefin crystalline thermoplastic resin (B-1) with one or two or more kinds of the foregoing α-olefin amorphous thermoplastic resin (B-2) also can be used.

According to the present invention, a mass ratio (A)/(B) of the component (A) and the component (B) included in the thermoplastic elastomer composition (1) is preferably from 95/5 to 20/80, more preferably from 95/5 to 40/60, and particularly preferably from 95/5 to 60/40. When the content of the component (A) is less than 20% and that of the component (B) exceeds 80%, the resulting thermoplastic elastomer composition is liable to have decreased flexibility and rubber elasticity. Accordingly, a foam which is excellent in flexibility and rubber elasticity can be obtained by using the thermoplastic elastomer composition containing 20% or more of the component (A) and 80% or less of the component (B). On the other hand, when the content of the component (A) exceeds 95% and that of the component (B) is less than 5%, the phase structure (morphology) of the resulting thermoplastic elastomer composition is hardly to have a fine sea-island structure (the thermoplastic resin is sea (matrix) and the crosslinked rubber particles are islands (domain)) which is the feature of a dynamically crosslinked type thermoplastic elastomer composition, whereby the thermoplastic elastomer composition is liable to have decreased fluidity and molding processability.

A thermoplastic elastomer composition (1) is obtained by a dynamically heat treatment of a mixture containing the components (A) and (B) in the presence of a crosslinking agent (C). The "dynamically heat treatment" herein means to conduct both of applying shearing force and heating. Specifically, the thermoplastic elastomer composition obtained by such a dynamically heat treatment has so called a sea-island structure, i.e., contains the component (B) as a sea phase and particles of the component (A) dispersed therein as an island phase.

Crosslinking Agent (C)

A kind of the crosslinking agent (C) (hereinafter, also referred to component (C)) used in the dynamically heat treatment is not particularly limited. However, the crosslinking agent (C) is desirably a compound capable of crosslinking at least the component (A) by the dynamically heat treatment at a temperature not less than the melting point of the component (B).

As the specific examples of the component (C), an organic peroxide, a phenol resin, sulfur, a sulfur compound, p-quinone, a p-quinone dioxime derivative, a bismaleimide compound, an epoxy compound, a silane compound, an amino resin, a polyol, a polyamine, a triazine compound and a metallic soap can be used. In particular, an organic peroxide and a phenol resin are preferred. They can be used alone or in combination thereof.

Examples of the organic peroxide include 1,3-bis(t-butylperoxyisopropyl)benzene, 2,5-dimethyl-2,5-bis(t-butylperoxy)hexyne-3, 2,5-dimethyl-2,5-bis(t-butylperoxy)hexene-3, 2,5-dimethyl-2,5-bis(t-butylperoxy)hexane, 2,2'-bis(t-butylperoxy)-p-isopropylbenzene, dicumylperoxide, di-t-butylperoxide, t-butylperoxide, p-menthaneperoxide, 1,1-bis(t-butylperoxy)-3,3,5-trimethylcyclohexane, dilauroyl peroxide, diacetyl peroxide, t-butylperoxy benzoate, 2,4-dichlorobenzoyl peroxide, p-chlorobenzoyl peroxide, benzoyl peroxide, di(t-butylperoxy)perbenzoate, n-butyl-4,4'-bis(t-butylperoxy)valerate, and t-butylperoxyisopropyl carbonate. In particular, 1,3-bis(t-butylperoxyisopropyl)benzene, 2,5-dimethyl-2,5-di(t-butylperoxy)hexine-3,2,5-dimethyl-2,5-di(t-butylperoxy)hexane, α,α-bis(t-butylperoxy) diisopropyl benzene, dicumyl peroxide, and di-t-butyl peroxide are preferred. These compounds can be used alone or in combination thereof.

Examples of the phenol resin include a p-substituted phenol compounds which are represented by the following formula (7), an o-substituted phenol/aldehyde condensate, a m-substituted phenol/aldehyde condensate, and a brominated alkylphenol/aldehyde condensate. In particular, a p-substituted phenol compound is preferred. They can be used alone or in combination thereof.

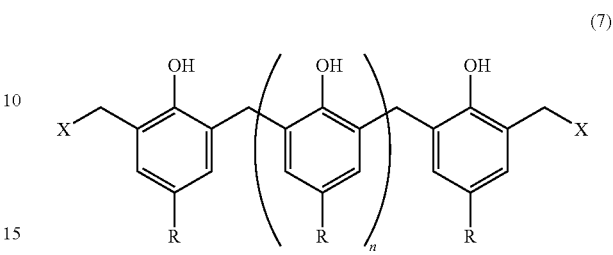

(7)

In the foregoing formula (7), X represents a hydroxyl group, a halogenated alkyl group or halogen atom; R represents a saturated hydrocarbon group having 1 to 15 carbon atoms; and n is an integer of from 0 to 10. The p-substituted phenol compound can be obtained by a condensation reaction of a p-substituted phenol with an aldehyde (preferably formaldehyde).

The component (C) is used preferably in an amount of from 0.01 to 20 parts by mass, more preferably from 0.1 to 15 parts by mass, and further preferably from 1 to 10 parts by mass on the basis of 100 parts by mass of the sum of the components (A) and (B) included in a mixture for producing the thermoplastic elastomer composition (1).

In a case where an organic peroxide is used as the component (C), the organic peroxide is used preferably in an amount of from 0.05 to 10 parts by mass, more preferably from 0.1 to 5 parts by mass on the basis of 100 parts by mass of the sum of the components (A) and (B) included in a mixture for producing the thermoplastic elastomer composition (1). When the amount of the organic peroxide exceeds 10 parts by mass, excessive crosslinking may occur to decrease molding processability. Thus, the resulting thermoplastic elastomer composition is liable to have a decreased mechanical and physical properties. On the other hand, when the amount of the organic peroxide is less than 0.05 parts by mass, crosslinking degree is insufficient so that the resulting thermoplastic elastomer composition (1) is liable to have a decreased rubber elasticity and mechanical properties.

In a case where a phenol resin is used as the component (C), the phenol resin is used preferably in an amount of from 0.2 to 10 parts by mass, more preferably from 0.5 to 5 parts by mass on the basis of 100 parts by mass of the sum of the components (A) and (B) included in a mixture for producing the thermoplastic elastomer composition (1). When the amount of the phenol resin exceeds 10 parts by masse the resulting thermoplastic elastomer composition (1) is liable to have a decreased molding processability. On the other hand, when the amount of the phenol resin is less than 0.2 parts by mass, crosslinking degree is insufficient so that the resulting thermoplastic elastomer composition (1) is liable to have decreased rubber elasticity and mechanical properties.

It is preferable to use a crosslinking assistant and/or a crosslinking accelerator together with a crosslinking agent, since a crosslinking reaction can proceed gently to form a uniform crosslinking. In a case where an organic peroxide is used as a crosslinking agent, sulfur, a sulfur compound (powdery sulfur, colloidal sulfur, precipitating sulfur, insoluble sulfur, surface-treated sulfur, dipentamethylenethiuram tetrasulfide and the like), an oxime compound (p-quinone oxime, p,p'-dibenzoylquinone oxime and the like), polyfunctional monomers (ethyleneglycoldi(meth)acrylate, diethyleneglycoldi(meth)acrylate, triethyleneglycoldi(meth)acrylate, tetraethyleneglycoldi(meth)acrylate, polyethyleneglycoldi(meth)acrylate, trimethylolpropanetri(meth)acrylate, diallyl phthalate, tetraallyloxyethane, triallyl cyanurate, N,N'-m-phynylenebismaleimide, N,N'-tolylenebismaleimide, maleic anhydride, divinyl benzene, zinc di(meth)acrylate and the like) can be preferably used as a crosslinking assistant. In particular, p,p'-dibenzoylquinone oxime, N,N'-m-phynylenebismaleimide and divinyl benzene are preferred. They can be used alone or in combination thereof. It should be noted that since N,N'-m-phynylenebismaleimide exhibits the function of a crosslinking agent, it can be used alone as a crosslinking agent.

In a case where an organic peroxide is used as a crosslinking agent, a crosslinking assistant is used preferably in an amount of 10 parts by mass or less, more preferably from 0.2 to 5 parts by mass on the basis of 100 parts by mass of the sum of the components (A) and (B) included in a mixture. When the amount of the crosslinking assistant exceeds 10 parts by mass, excessive crosslinking may occur to decrease molding processability. Thus, the resulting thermoplastic elastomer composition is liable to have decreased mechanical and physical properties.

In a case where a phenol resin is used as a crosslinking agent, it is preferable to use a metal halide (stannous chloride, ferric chloride or the like) or an organic halide (chlorinated polypropylene, brominated butyl rubber, chloroprene rubber or the like) as a crosslinking accelerator, since a crosslinking speed can be controlled.

In addition to the crosslinking accelerator, it is further preferable to use a metal oxide such as zinc oxide or a dispersant such as stearic acid.

(Softener)

The thermoplastic elastomer composition (1) preferably further contains a softener. The inclusion of the softener can improve processability and flexibility. As the softener, those currently used in a rubber product can be suitably used.

Specific examples of the softener include petroleum oil materials such as process oil, lubricating oil, paraffin oil, liquid paraffin oil, petroleum asphalt and vaseline; coal tars such as coal tar and coal tar pitch; fatty oils such as castor oil, linseed oil, rapeseed oil, soybean oil and copra oil; waxes such as toll oil, bees wax, carnauba wax and lanolin; fatty acids such as recinoleic acid, palmitic acid, stearic acid, barium stearate and calcium stearate or metal salts thereof; synthetic polymer substances such as petroleum resin, coumaroneindene resin and atactic polyropylene; ester compounds such as dioctyl phthalate, dioctyl adipate and dioctyl sebacate; microcrystalline wax, sub(factice), liquid polybutadiene, modified liquid polybutadiene, liquid thiocol, liquid polyisoprene, liquid polybutene and liquid ethylene-α-olefin copolymer. In particular, paraffin, naphthene, aromatic mineral oils, liquid polyisoprene, liquid polybutene and liquid ethylene-α-olefin copolymer are preferred. Paraffin mineral oil, liquid polyisoprene, liquid polybutene and liquid α-olefin copolymer are more preferred.

The content of the softener is preferably from 0 to 200 parts by mass, more preferably from 0 to 150 parts by mass, and particularly preferably from 0 to 100 parts by mass, based on 100 parts by weight of the component (A). When the content of the softener exceeds 200 parts by mass to 100 parts by weight of the component (A), the softener may cause poor dispersion upon kneading with the components (A) and (B).

The melt flow rate (hereinafter, also referred to as MFR) of the thermoplastic elastomer composition (1) is from 0.1 to 100 g/10 min, preferably from 1.0 to 50 g/min and more preferably from 2.0 to 40 g/min at a temperature of 230° C. and a load of 98 N. When the MFR of the thermoplastic elastomer composition (1) exceeds 100 g/10 min, it shows a low foaming magnification. Thus, independent cells are difficult to form and the shape of a cell formed is hardly to be uniform. On the other hand, when the MFR of the thermoplastic elastomer composition (1) is less than 0.1 g/10 min, processability thereof according to various foam production methods sometimes may be insufficient. Accordingly, by using the thermoplastic elastomer composition (1) having a given range of MFR, a foam having a high foaming magnification, highly independent cells and a uniform foamed cell shape can be obtained.

The hardness (duro A) of the thermoplastic elastomer composition (1) is 90 or less, preferably 85 or less and more preferably 80 or less. When the hardness (duro A) of the thermoplastic elastomer composition exceeds 90, in a case of foaming, the resulting foam is poor in flexibility. Thus, by using the thermoplastic elastomer composition (1) having a predetermined value or less of a hardness (duro A) r a foam which is excellent in flexibility can be obtained.

The thermoplastic elastomer composition (1) can be obtained by a dynamically heat treatment of a mixture including the components (A) and (B) in the presence of the component (C). In preparing the mixture to be subjected to the dynamically heat treatment, the components (A) and (B) can be used as they are. Alternatively, the mixture can be prepared as the composition containing the components (A) and (B), which respectively include the same or different additive(s) (the below-mentioned additives and the like). The component (A) can be in the form of a veil, a crumb, a pellet or powder (including pulverized products of a veil-shaped rubber or a crumb-shaped rubber). Plural components (A) each having a different shape from each other can be used in combination.

As a device used for the dynamically heat treatment, a melt-kneading device can be mentioned as a preferable example. The treatment according to this melt-kneading device can be either of a continuous manner or a batch manner. Specific examples of the melt-kneading device include an open-type mixing roll, a closed-type Banbury mixer, a single-screw extruder, a twin-screw extruder, a continuous kneader and a pressurizing kneader. Of these devices, in view of economics, treatment efficiency or the like, continuous melt-kneading devices such as a single-screw extruder, a twin-screw extruder and a continuous kneader are preferably used. Two or more continuous melt-kneading devices, which are the same or different in their type, can be used in combination.

The L/D ratio of the twin-screw extruder (ratio of effective length of screw L and outer diameter D) is preferably 30 or more, more preferably from 36 to 60. As the twin-screw extruder, an optional twin-screw extruder can be used. Namely, one in which two screws are or are not in meshing engagement with each other or the like can be used. However, a twin-screw extruder in which two screws rotate in the same direction and are in meshing engagement is preferable. Examples of such a twin-screw extruder include those respectively having the trade name "PCM" (manufactured by Ikegai Co., Ltd.), the trade name "KTX" (manufactured by Kobe Steel, Ltd.), the trade name "TEX" (manufactured by The Japan Steel Works, Ltd.), the trade name "TEM" (manufactured by Toshiba Machine Co., Ltd.) and the trade name "ZSK" (manufactured by Warner Inc.).

The L/D ratio of the continuous kneader (ratio of effective length of screw L and outer diameter D) is preferably 5 or more, more preferably 10 or more. As such a continuous kneader, the trade name "Mixtron KTX·LCY·NCM" (manufactured by Kobe Steel, Ltd.) and the trade name "CIM·CMP" (manufactured by The Japan Steel Works, Ltd.) can be mentioned.

A temperature upon a dynamically heat treatment is preferably from 120 to 350° C., more preferably from 150 to 290° C. The treatment is effected preferably for from 20 seconds to 320 minutes, preferably for from 30 seconds to 25 minutes. Shearing force to be applied is preferably from 10 to 20,000/seconds, more preferably from 100 to 10,000/seconds, in terms of shear rate.

In preparing a polyolefin resin composition using the thermoplastic elastomer composition (1), the shape of the composition (1) is not particularly limited. It can be in the form of pellet, powder or the like.

Polyolefin Resin (2)

As a polyolefin resin (2), any one of a polyolefin crystalline resin, a polyolefin amorphous resin or a mixture thereof can be used. As the polyolefin crystalline resin and the polyolefin amorphous resin, those exemplified in the forgoing α-olefin thermoplastic resin (B) can be used.

The melt tension of the polyolefin resin (2) at a temperature of 210° C. and at a take-up speed of 2.0 m/min is not particularly limited. However, it is preferably 3.0 cN or more (for example, around 3.0 to 50 cN), more preferably 5.0 cN or more (for example, around 5.0 to 50 cN), and particularly preferably 8.0 cN or more (for example, around 8.0 to 50 cN). In a case where the foregoing melt tension of the polyolefin resin (2) is less than 3.0, when the polyolefin resin composition is foamed, it has a low foaming magnification so that independent cells are difficult to form. Further, the formed cell is difficult to have a uniform shape. Therefore, for obtaining a foam having a high foaming magnification, highly independent cells and a uniform foamed cell shape, the foregoing melt tension of the polyolefin resin (2) is preferably 3.0 cN or more.

A use amount of the polyolefin resin (2) is, for example, from 10 to 200 parts by mass, preferably from 20 to 100 parts by mass, based on 100 parts by mass of the foregoing thermoplastic elastomer composition (1). When the polyolefin resin (2) is used in an amount of less than 10 parts by mass based on 100 parts by mass of the foregoing thermoplastic elastomer composition (1), gas leakage may readily occur upon foaming so that a foam having a high foaming magnification can be hardly obtained. On the other hand, when the amount of the polyolefin resin (2) exceeds 200 parts by mass, the cushioning property of the resulting foam tends to decrease.

In preparing a polyolefin resin composition using the polyolefin resin (2), the shape of the polyolefin resin (2) is not particularly limited. It can have a shape of pellet, powder or the like.

Nucleant Agent (3)

The polyolefin resin composition in the present invention contains a nucleant agent having an average particle diameter of from 0.1 μm to less than 2.0 μm (3). As the nucleant agent, oxides, composite oxide, metal carbonates, metal sulfates and metal hydroxides, e.g., talc, silica, alumina, mica, titania, zinc oxide, zeolite, calcium carbonate, magnesium carbonate, barium sulfate and aluminum hydroxide. The inclusion of the nucleant agent can readily control a cell diameter of a foam to be able to provide a foam having an appropriate flexibility and excellent in cutting processability.

An average particle diameter of the nucleant agent (3) is preferably from 0.3 μm to 1.5 μm, particularly preferably from 0.4 μm to 1.2 μm. When the average particle diameter of the nucleant agent (3) is less than 0.1 μm, the nucleant agent (3) cannot adequately function as a nucleant agent. On the other hand, when the average particle diameter of the nucleant agent (3) is 2.0 μm or more, the nucleant agent (3) may break the cell wall to fail to achieve a high foaming magnification.

The average particle diameter of the nucleant agent can be determined by a particle size distribution method according to Laser Diffraction Method. For example, the average particle diameter can be determined (automatic determination mode) using a dispersed and diluted liquid of a sample by means of "Micro Tract MT-3000" manufactured by Leeds & Northrup Instruments Inc.

A use amount of the nucleant agent (3) is preferably from 0.5 to 150 parts by mass, more preferably from 2 to 140 parts by mass, and particularly preferably from 3 to 130 parts by mass on the basis of 100 parts by mass of all amounts of polymers in the polyolefin composition (the sum of the rubber (A) and the α-olefin thermoplastic resin (B) and the polyolefin resin (2). When the nucleant agent is used in an excessively small amount, it cannot produce an adequate effect. On the contrary, when the nucleant agent is used in an excessively large amount, foaming of the composition is liable to be inhibited. The nucleant agent can be added to a molding machine as a master batch using a polyolefin resin (2) or the like. It should be noted that the nucleant agent (3) optionally can be added in the preparation of the thermoplastic elastomer composition (1).

Aliphatic Compound (4)

The polyolefin resin composition in the present invention contains, in addition to the components (1) to (3), (4) at least one aliphatic compound having a polar functional group and having a melting point of from 50 to 150° C., which is selected from an aliphatic acid, an aliphatic acid amide and an aliphatic acid metallic soap.

The aliphatic compound (4) is highly crystalline. Thus, when the compound (4) is added to a polyolefin resin, it forms a strong film on the resin surface. When the resulting resin foam is subjected to a punching processing, the cell of the foam hardly collapses. It can be considered that this phenomenon is owing to the inhibition of the blocking among the resin walls which form cells. Thus, the foam comes to have an improved shape restoration and to have an improved punching processing property.

As the foregoing aliphatic compound (4), at least one aliphatic compound selected from an aliphatic acid, an aliphatic acid amide and an aliphatic acid metallic soap can be used. Since these compounds containing a highly polar functional group are hardly incompatible with a polyolefin resin, these are readily deposited on the resin surface to readily provide the foregoing effect. The melting point of the foregoing aliphatic compound (4) is from 50 to 150° C., preferably from 70 to 100° C., in view of lowering a molding temperature, inhibiting the deterioration of a polyolefin resin composition, imparting a sublimation resistance or the like.

As the foregoing aliphatic acid, those having around 18 to 38 carbon atoms (preferably from 18 to 22) are preferred. Specific examples thereof include stearic acid, vehenic acid and 12-hydroxystearic acid. Of these compounds, vehenic acid is particularly preferred. As the aliphatic acid amide, those having around 18 to 38 carbon atoms (more preferably 18 to 22 carbon atoms) in moiety thereof are preferred. They can be either of monoamide or bisamide. Specifically, stearic amide, oleic amide, erucamide, methylenebisstearic amide and ethylenebisstearic amide may be mentioned. Of these compounds, erucamide is particularly preferred. As the aliphatic acid metallic soap, mention may be made of salts of the foregoing aliphatic acids with aluminum, calcium, magnesium, lithium, barium, zinc and lead. As the aliphatic compound (4), particularly, aliphatic acids and aliphatic amides are preferred.

The content of the foregoing aliphatic compound (4) is, for example, from 1 to 5 parts by mass, preferably from 1.5 to 3.5 parts by mass and more preferably from 2 to 3 parts by mass based on 100 parts by mass of the sum of components (1) and (2). When the content of the aliphatic compound (4) is less than 1 part by mass, sufficient amount of the component (4) is not deposited on the surface of the resin so that effects of improvement in punching processing are difficult to be obtained. On the other hand, when it exceeds 5 parts by mass, the resin is plasticized to fail to keep sufficient pressure in an extruder. Thus, the content of a foaming agent such as carbon dioxide in the resin is decreased and, therefore, the resin cannot have a high foaming magnification. As a result, a foam having a sufficient foam density is difficult to be obtained.

The polyolefin resin composition in the present invention may optionally contain various additives. Examples of such additives include a foaming agent, a lubricant, a shrinkage-preventing agent, an antioxidant, a thermal stabilizer, a light resisting agent such as HALS, a weathering agent, a metal inactivator, a UV absorber, a light stabilizer, a stabilizer such as a copper-induced degradation inhibiting agent, an antibacterial agent, an antifungal agent, a dispersant, a plasticizer, a flame retardant, a tackifier, carbon black, a colorant such as an organic pigment, a filler, an isobutylene/isoprene copolymer, rubber such as silicone rubber, an ethylene/vinyl acetate copolymer, and a thermoplastic resin such as ABS resin. These additives can be optionally added in the preparation of the thermoplastic elastomer composition (1).

Polyolefin Resin Foam

The polyolefin resin foam of the present invention is obtained by foaming a polyolefin resin composition containing the foregoing components (1), (2) and (3), using carbon dioxide in supercritical state. In accordance with the present invention, since carbon dioxide is used as a foaming agent, the foaming agent is impregnated into a material of a foam such as rubber, α-olefin thermoplastic resin or a polyolefin resin in a large amount at a high speed. Further, since carbon dioxide in supercritical state is used, the solubility thereof in the resin increases and it is possible to incorporate a high concentration of carbon dioxide into the resin. Further, upon a drastic pressure lowering, cell nuclei are generated in a large amount because of the high concentration of carbon dioxide and cells formed by the growth of the cell nuclei have a high density compared with those in other states even in the same porosity. Thus, fine cells can be obtained. The critical temperature and the critical pressure of carbon dioxide is 31° C. and 7.4 MPa, respectively.

The preparation of a polyolefin resin composition can be effected using a commonly used melt-kneading device such as an open-type mixing roll, a closed-type Banbury mixer, a single-screw extruder, a twin-screw extruder, a continuous kneader and a pressurizing kneader.

The preparation of the polyolefin resin foam of the present invention is not particularly limited so long as it is conducted by a method capable of performing foam molding using the foregoing polyolefin resin composition, and the preparation can be effected by either of a batch method or a continuous method.

A method for producing a polyolefin resin foam according to a batch method is exemplified below. First, the foregoing polyolefin resin composition is extruded by an extruder such as a single-screw extruder or a twin-screw extruder to form a resin sheet for molding a foam. Alternatively, the foregoing polyolefin resin composition is homogeneously kneaded by means of a kneader provided with blades, such as a roller, cum, kneader, or Banbury type kneader and the kneaded product is subjected to a press-processing to have a predetermined thickness using a hot-plate press, whereby a resin sheet for molding a foam is formed. The resin sheet thus obtained (unfoamed sheet) is placed into a high-pressure vessel, and carbon dioxide in supercritical state is injected thereinto so that the carbon dioxide may be impregnated into the foregoing unfoamed sheet. At a time when the carbon dioxide is sufficiently impregnated, pressure is released (usually up to atmospheric pressure) thereby to generate cell nuclei in a resin constituting a sheet. The cell nuclei can be grown at room temperature without heating. However, they can be optionally grown by heating. As the heating method, known or conventional means such as water bath, oil bath, hot roll, hot-air oven, far-infrared irradiation, near-infrared irradiation, microwave irradiation, and the like can be adopted. After the cells are grown as described above, they are rapidly cooled with, e.g., cold water to fix their shape. Thus, the olefin resin foam can be obtained. Furthermore, the molded product to be used for foaming is not limited to a sheet shaped product and products having various shapes can be used depending upon a use. The molded product to be subjected to foaming can be also prepared by, in addition to extrusion molding and press molding, other molding methods such as injection molding.

Next, a method for producing a polyolefin resin foam according to a continuous method is exemplified below. With kneading the foregoing polyolefin resin composition by an extruder such as a single-screw extruder or a twin-screw extruder, carbon dioxide in supercritical state is injected into the extruder. After sufficiently impregnating carbon dioxide into the resin, the resulting product is extruded to thereby release pressure (usually up to atmospheric pressure) to grow cell nuclei. In the cell growth, optionally heating is effected. After the cells are grown as described above, they are rapidly cooled with, e.g., cold water to fix their shape. Thus, the olefin resin foam can be obtained. The foam molding can be effected by using, in addition to an extruder, an injection molding machine. The shape of the foam is not particularly limited and can be in the form of sheet, prism, cylinder or heteromorphy.

The pressure at the time when carbon dioxide in supercritical state is impregnated into a molded product or a resin kneaded product, which are to be subjected to foaming, may be suitably selected in consideration of operability and the like, and the pressure can be, for example, 7.4 MPa or more (e.g., about from 7.4 to 100 MPa), preferably 8 MPa or more (e.g., about from 8 to 50 MPa). When the pressure of the carbon dioxide is lower than 7.4 MPa, the supercritical state of the carbon dioxide cannot be kept and the cell growth is remarkable upon foaming so that the cell diameter becomes too large in many cases. This is because the impregnated amount of the gas under low pressure is relatively small as compared with that under high pressure and the cell nucleant-forming rate may be lowered to decrease the number of cell nuclei formed. As the result, the amount of the gas per cell contrary increases and thus cell diameter becomes extremely large. Moreover, in the pressure region of lower than 7.4 MPa, cell diameter and cell density cause a remarkable change by a slight change in the impregnation pressure. Thus, it is liable to be difficult to control the cell diameter and cell density.

A temperature in the gas impregnation step varies depending on the kind of an α-olefin thermoplastic resin or a polyolefin resin and can be selected from a wide range. In consideration of operability and the like, for example, the temperature may be about from 31 to 350° C. In order to keep the supercritical state of carbon dioxide, the temperature at the time of impregnation is preferably 32° C. or more, particularly preferably 40° C. or more. For example, the impregnation temperature in the case of impregnating an inert gas into an unfoamed resin molded product having a sheet shape in the batch method is about from 32 to 200° C., preferably about from 40 to 200° C., Moreover, when a melted polymer having a gas impregnated therein is extruded to simultaneously effect foaming and molding, the impregnation temperature in the continuous method is usually about from 60 to 350° C.

In the foregoing pressure reduction step, the pressure reduction rate is not particularly limited. However, for obtaining a homogeneous fine cell, it is preferably about from 5 to 20 GPa/second. The heating temperature in the foregoing heating step is, for example, about from 40 to 250° C., preferably about 60 to 250° C.

The polyolefin resin foam thus obtained has a high foaming magnification, highly independent cells, and a homogeneous shape of the foamed cell. Further, it is excellent in flexibility and cushioning property, and has a good surface appearance. The density of the polyolefin resin foam is, for example, 0.2 g/cm$^3$ or less (from 0.01 to 0.2 g/cm$^3$), preferably from 0.02 to 0.15 g/cm$^3$, and further preferably from 0.03 to 0.12 g/cm$^3$. In this polyolefin resin foam, the cell structure thereof is difficult to be deformed or to cause shrinkage. Thus, the polyolefin resin foam is excellent in strain recovery upon pressing. Further, since the nucleant agent has a small particle size, extremely fine cells can be formed. Additionally, since the breaking of the cell wall due to the nucleant can be prevented, for example, in punching processing the foam, cells in the punching site hardly collapse. Therefore, the foam has a feature of having an excellent shape recovering property at a time of cutting processing or the like.

The shape and the size of the polyolefin resin foam according to the present invention are not particularly limited. However, because of being excellent in the cutting processing as described above, the foam is particularly useful as a sheet-shaped foam. When the polyolefin resin foam of the present invention has a sheet shape, for example, the thickness of the sheet can be selected from the wide range of about from 0.1 to 5 mm. Particularly, even when the foam is in the form of a thin sheet having a thickness of about from 0.2 to 3.0 mm, the thin sheet can be suitably used as a foamed sheet excellent in processability.

The polyolefin resin foam according to the present invention can be used, for example, as an internal insulator of an electronic device and an information device, a cushioning material, a dust proofing agent, a sound insulating material, a heat insulating material, a food packing material, a clothing material, a building material, and interior parts or exterior parts of an automobile and home electric appliances.

EXAMPLES

The following will specifically explain the present invention with reference to Examples but the invention is not limited to these Examples. In Examples, "parts" and "%" are by mass, unless otherwise specified.

Materials and additives used in Production Examples and Examples are as follows.
<Butadiene Rubber>
 Mooney viscosity (ML$_{1+4}$, 100° C.)=39, 1,4-cis bond content=97.0%, 1,2-vinyl bond content=1.2%, molecular weight distribution (Mw/Mn)=2.8
<EPDM Rubber>
 A terpolymer comprising ethylene/propylene/5-ethylidene-2-norbornene (ethylene content=66%, propylene content=29.5%, 5-ethylidene-2-norbornene content=4.5%; intrinsic viscosity in Decalin at 135° C.=4.7 dl/g). An oil-extended rubber used in the present production example was prepared by adding a mineral oil softener (trade name Diana Process Oil PW-90 manufactured by Idemitsu Kosan Co., Ltd.) to the solution of this terpolymer rubber, and then eliminating the solvent. The oil-extended amount of the foregoing mineral oil softener is 100 parts to 100 parts of the foregoing terpolymer rubber.
<Thermoplastic Resin (Trade Name "Novatec BC06C")>
 Crystalline polypropylene/ethylene block copolymer manufactured by Japan Polypropyrene Co., Ltd. (density 0.90 g/cm$^3$, MRF at a temperature of 230° C. and a load of 21.2 N=60 g/10 min., measured melt tension at a temperature of 210° C. and at a take-up speed of 2.0 m/min=0.5 cN)
<Thermoplastic Resin (Trade Name "Novatec FA3EB")>
 Crystalline propylene polymer manufactured by Japan Polypropyrene Co., Ltd. (density=0.90 g/cm$^3$, MRF at a temperature of 230° C. and a load of 21.2 N=10.5 g/10 min., measured melt tension at a temperature of 210° C. and at a take-up speed of 2.0 m/min=1.3 cN)
<Paraffin Mineral Oil>
 Hydrogenated paraffin mineral oil, trade name "Diana Process Oil PW-90" manufactured by Idemitsu Kosan Co., Ltd. (pour point=−15° C., kinematic viscosity (40° C.)=95.54 cSt
<Antioxidant>
 Pentaerythritoltetrakis[3-(3,5-di-t-butyl-4-hydroxyphenyl)propionate], trade name "Iruganox 1010" manufactured by Ciba Specialty Chemicals K.K
<Crosslinking Agent>
 2,5-dimethyl-2,5-di(t-butylperoxy)hexane, trade name "Perhexa 25B-40" manufactured by Nippon Oils & Fats Co., Ltd.
<Crosslinking Assistant>
 Divinyl benzene having a purity of 81% manufactured by Nippon Steel Chemical
<Thermoplastic Resin (Trade Name "Newstren SH9000")
 Crystalline propylene polymer manufactured by Japan Polypropyrene Co., Ltd. (density=0.90 g/cm$^3$, MRF at a temperature of 230° C. and a load of 21.2 N=0.3 g/10 min., measured melt tension at a temperature of 210° C. and at a take-up speed of 2.0 m/min=20.0 cN, melt tension catalog value at a temperature of 210° C.=20.0 cN)
<Lubricant>
 Trade name "Polysuren EE15Z" manufactured by Eiwa Chemical Co., Ltd.
<Nucleant Agent>
 Magnesium hydroxide having an average particle diameter of 0.8 μm, trade name "MGZ-1" manufactured by Sakai chemical industry Co., Ltd.
<Carbon Black>
 Trade name "Asahi No. 35" manufactured by Asahi Carbon Co., Ltd.

The melt tension of a thermoplastic resin was determined according to the following conditions.
 Apparatus: manufactured by Toyo Seiki Seisaku Sho, Melt Tension Tester Model II
 Temperature: 210° C.
 Orifice diameter: 2 mmφ
 Extrusion speed: 10.0 mm/min
 Take-up speed: 2.0 m/min Production Example 1

A 36 parts amount of butadiene rubber, 40 parts of an oil-extended EPDM, 14 parts of a thermoplastic resin (trade name "Novatec BC06C"), 10 parts of a paraffin mineral oil and 0.2 parts of an antioxidant were mixed in a Henshel mixer, then the resulting mixture was placed into a pressurized type kneader (capacity 10 l, manufactured by Moriyama K.K.) which had been previously heated to 160° C. Kneading was continued at 40 rpm (shear rate 200/sec) for 15 minutes until the thermoplastic resin was melted and respective components were homogeneously dispersed, whereby a kneaded product in a molten state was obtained. The kneaded product in a molten state obtained was pelletized by a feederruder (manufactured by Moriyama K.K.). Into a Henshel mixer, 100.2 parts of the palletized kneaded product, 1.0 part of a crosslinking agent and 1.0 part of a crosslinking assistant were placed and mixed for 30 seconds. Thereafter, the resulting mixture was extruded during which it was subjected to a dynamically heat treatment at a temperature of 180° C., a retention time of 1 minute and 30 seconds, 300 rpm (shear rate 400/sec) using a twin-screw extruder (screw in complete meshing engagement in the same direction, ratio of length of screw flight part (L) and screw diameter (D): (L)/(D)=33.5, trade name "PCM45", manufactured by Ikegai K.K.). Thus, a palletized product (thermoplastic elastomer composition (i)) was obtained.

Production Example 2

A 100 parts amount of the palletized product obtained in the Production Example 1 and 25 parts of carbon black were placed into a pressurized type kneader (capacity 10 l, manufactured by Moriyama K.K.) which had been previously heated to 160° C. Kneading was conducted at 40 rpm (shear rate 200/sec) for 15 minutes until the thermoplastic elastomer composition was melted and respective components were homogeneously dispersed, whereby a kneaded product in a molten state was obtained. The kneaded product in a molten state obtained was pelletized by a feederruder (manufactured by Moriyama K.K.) to obtain a thermoplastic elastomer composition (ii).

Production Example 3

A 90 parts amount of an oil-extended EPDM, 10 parts of a thermoplastic resin (trade name "Novatec FA3EB") and 0.2 parts of an antioxidant were mixed in a Henshel mixer, then the resulting mixture was placed into a pressurizing kneader (capacity 10 l, manufactured by Moriyama K.K.) which had been previously heated to 160° C. Kneading was performed at 40 rpm (shear rate 200/sec) for 15 minutes until the thermoplastic resin was melted and respective components were homogeneously dispersed, whereby a kneaded product in a molten state was obtained. The kneaded product in a molten state obtained was pelletized by a feederruder. Into a Henshel mixer, 100.2 parts of the palletized kneaded product, 1.0 part of a crosslinking agent and 1.0 part of a crosslinking assistant were placed and mixed for 30 seconds. Thereafter, the resulting mixture was extruded during which it was subjected to a dynamically heat treatment at a temperature of 220° C., a retention time of 1 minute and 30 seconds, 400 rpm (shear rate 400/sec) using a twin-screw extrudes (screw in complete meshing engagement in the same direction, ratio of length of screw flight part (L) and screw diameter (D): (L)/(D)=33.5, trade name "PCM45", manufactured by Ikegai K.K.). Thus, a palletized product (thermoplastic elastomer composition (iii)) was obtained.

Example 1

A 70 parts amount of the thermoplastic elastomer (i) obtained in Production Example 1, 30 parts of a thermoplastic resin (trade name "Newstren SH9000"), 10 parts of a lubricant (master batch obtained by formulating 1 part of stearic acid monoglyceride and 10 parts of polyethylene) and 10 parts of a nucleant agent (magnesium hydroxide having an average particle diameter of 0.8 μm) were kneaded by means of a twin-screw extruder at 200° C., then the resulting kneaded product was extruded in the form of strand. After water-cooling, the resulting extruded product was cut in the form of pellets and molded. The pellets obtained were placed into a single-screw extruder and carbon dioxide was injected thereto in an atmosphere of 220° C. under a pressure of 14 MPa (after injection, 18 MPa). After the sufficient saturation of the carbon dioxide, the pellets were extruded through a die to obtain a sheet-shaped foam (thickness 2.0 mm).

Example 2

A 93.3 parts amount of the thermoplastic elastomer (ii) obtained in Production Example 2, 39 parts of a thermoplastic resin (trade name "Newstren SH9000"), 10 parts of a lubricant (master batch obtained by formulating 1 part of stearic acid monoglyceride and 10 parts of polyethylene) and 10 parts of a nucleant agent (magnesium hydroxide having an average particle diameter of 0.8 μm) were kneaded by means of a twin-screw extruder at 200° C., then the resulting kneaded product was extruded in the form of strand. After water-cooling, the resulting extruded product was cut in the form of pellets and molded. The pellets obtained were placed into a single-screw extruder and carbon dioxide was injected thereto in an atmosphere of 220° C. under a pressure of 14 MPa (after injection, 18 MPa). After the sufficient saturation of the carbon dioxide, the pellets were extruded through a die to obtain a sheet-shaped foam (thickness 2.4 mm).

Example 3

A 62 parts amount of the thermoplastic elastomer (iii) obtained in Production Example 3, 38 parts of a thermoplastic resin (trade name "Newstren SH9000"), 10 parts of a lubricant (master batch obtained by formulating 1 part of stearic acid monoglyceride and 10 parts of polyethylene) and 10 parts of a nucleant agent (magnesium hydroxide having an average particle diameter of 0.8 μm) were kneaded by means of a twin-screw extruder at 200° C., then the resulting kneaded product was extruded in the form of strand. After water-cooling, the resulting extruded product was cut in the form of pellets and molded. The pellets obtained were placed into a single-screw extruder and carbon dioxide was injected thereto in an atmosphere of 220° C. under a pressure of 14 MPa (after injection, 18 MPa). After the sufficient saturation of the carbon dioxide, the pellets were extruded through a die to obtain a sheet-shaped foam (thickness 2.0 mm).

Example 4

A 62 parts amount of the thermoplastic elastomer (iii) obtained in Production Example 3, 38 parts of a thermoplastic resin (trade name "Newstren SH9000"), 0.8 parts of a lubricant (master batch obtained by formulating 1 part of stearic acid monoglyceride and 10 parts of polyethylene), 8 parts of a nucleant agent (magnesium hydroxide having an average particle diameter of 0.8 μm) and 11 parts of carbon black were kneaded by means of a twin-screw extruder at 200° C., then the resulting kneaded product was extruded in the form of strand. After water-cooling, the resulting extruded product was cut in the form of pellets and molded. The pellets obtained were placed into a single-screw extruder and carbon dioxide was injected thereto in an atmosphere of 220° C. under a pressure of 14 MPa (after injection, 18 MPa). After the sufficient saturation of the carbon dioxide, the pellets were extruded through a die to obtain a sheet-shaped foam (thickness 2.1 mm).

Example 5

A 50 parts amount of the thermoplastic elastomer (iii) obtained in Production Example 3, 50 parts of a thermoplastic resin (trade name "Newstren SH9000"), 1.2 parts of a lubricant (master batch obtained by formulating 1 part of stearic acid monoglyceride and 10 parts of polyethylene), 8.4 parts of a nucleant agent (magnesium hydroxide having an average particle diameter of 0.8 μm) and 9.5 parts of carbon black were kneaded by means of a twin-screw extruder at 200° C., then the resulting kneaded product was extruded in the form of strand. After water-cooling, the resulting extruded product was cut in the form of pellets and molded. The pellets obtained were placed into a single-screw extruder and carbon dioxide was injected thereto in an atmosphere of 220° C. under a pressure of 14 MPa (after injection, 18 MPa). After the sufficient saturation of the carbon dioxide, the pellets were extruded through a die to obtain a sheet-shaped foam (thickness 2.3 mm).

Example 6

A 33 parts amount of the thermoplastic elastomer (iii) obtained in Production Example 3, 51 parts of a thermoplastic resin (trade name "Newstren SH9000"), 10 parts of a lubricant (master batch obtained by formulating 1 part of stearic acid monoglyceride and 10 parts of polyethylene), 10 parts of a nucleant agent (magnesium hydroxide having an average particle diameter of 0.8 μm), 6 parts of carbon black and 2 parts of erucamide (melting point 83°) were kneaded by means of a twin-screw extruder at 200° C., then the resulting kneaded product was extruded in the form of strand. After water-cooling, the resulting extruded product was cut in the form of pellets and molded. The pellets obtained were placed into a single-screw extruder and carbon dioxide was injected thereto in an atmosphere of 220° C. under a pressure of 14 MPa (after injection, 18 MPa). After the sufficient saturation of the carbon dioxide, the pellets were extruded through a die to obtain a sheet-shaped foam (thickness 2.0 mm).

Example 7

A 33 parts amount of the thermoplastic elastomer (iii) obtained in Production Example 3, 51 parts of a thermoplastic resin (trade name "Newstren SH9000"), 10 parts of a lubricant (master batch obtained by formulating 1 part of stearic acid monoglyceride and 10 parts of polyethylene), 10 parts of a nucleant agent (magnesium hydroxide having an average particle diameter of 0.8 μm), 6 parts of carbon black and 2 parts of behenic acid (melting point 77°) were kneaded by means of a twin-screw extruder at 200° C., then the resulting kneaded product was extruded in the form of strand. After water-cooling, the resulting extruded product was cut in the form of pellets and molded. The pellets obtained were placed into a single-screw extruder and carbon dioxide was injected thereto in an atmosphere of 220° C. under a pressure of 14 MPa (after injection, 18 MPa). After the sufficient saturation of the carbon dioxide, the pellets were extruded through a die to obtain a sheet-shaped foam (thickness 2.0 mm).

Comparative Example 1

A 50 parts amount of a thermoplastic elastomer (iv) [trade name "Excelink 3701B" manufactured by JSR Co., Ltd., a blend (TPO) of polypropylene (PP) and ethylene/propylene/5-ethylidene-2-norbornene terpolymer (EFT) (containing 16.7% by mass of carbon black)], 50 parts of a thermoplastic resin (trade name "Newstren SH9000"), 10 parts of a lubricant (master batch obtained by formulating 1 part of stearic acid monoglyceride and 10 parts of polyethylene) and 10 parts of a nucleant agent (magnesium hydroxide having an average particle diameter of 0.8 μm) were kneaded by means of a twin-screw extruder at 200° C., then the resulting kneaded product was extruded in the form of strand. After water-cooling, the resulting extruded product was cut in the form of pellets and molded. The pellets obtained were placed into a single-screw extruder and carbon dioxide was injected thereto in an atmosphere of 220° C. under a pressure of 14 MPa (after injection, 18 MPa). After the sufficient saturation of the carbon dioxide, the pellets were extruded through a die to obtain a sheet-shaped foam (thickness 2.3 mm).

Evaluation Test

The density, the cutting processability and 50% compression strain recovery of the respective sheet-shaped foams obtained in Examples and Comparative Example were evaluated. The measurements were effected regarding a foamed sheet having a thickness of about 1.0 mm formed by eliminating the skin layers of both surfaces of the respective foams, according to the following methods. The results are shown in Table 1.

Density of Foam

The sheet-shaped foam was punched to form a test piece having a size of 100 mm×100 mm. The size of the test piece was measured by using a slide caliper, then the mass thereof was measured by means of an electric balance. Thus, the density of the test piece was obtained according to the following equation.

$$\text{Density (g/cm}^3\text{)=test piece mass (g)/test piece volume (cm}^3\text{)}$$

Cutting Processability-1

Figure 2:
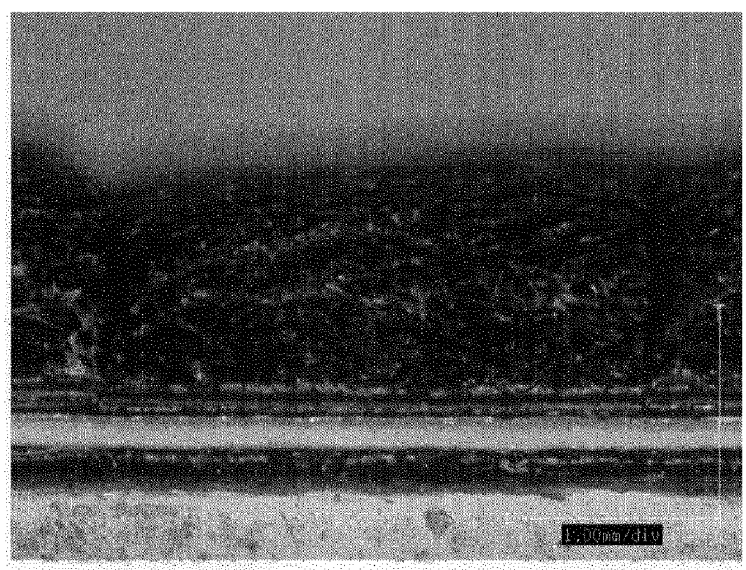
FIG. 2 is a digital microscopic photograph showing the state of a foam after punching in the case of the evaluation of "X" in the evaluation test of cutting processability in Examples.

A sheet-shaped foam (70 mm×220 mm) was placed on a plate made of polypropylene, and then, two pieces of blades (trade name "NCA07", thickness 0.7 mm, blade tip angle 43° manufacture by Nakayama Co., Ltd.) were pushed to punch out (cut) the foam. The two pieces of blades are fixed in such a state that a 1.8 mm spacer is inserted between them. The cut width was set at 2.5 mm. At two hours after punching, the foam was observed visually or by using a digital microscope and evaluated as follows: small collapse in the punched site of the foam (the thickness in the punched site of the foam (end part) and that of the other sites are substantially the same) was evaluated as "O" (refer to FIG. 1); and large collapse in the punched site of the foam (end part) (the upper end part of the punched site of the foam looks round and the thickness in the punched site of the foam and that of the other sites are large) was evaluated as "X" (refer to FIG. 2).

Cutting Processability-2

A sheet-shaped foam (70 mm×220 mm) was placed on a plate made of polypropylene, and then, two pieces of blades (trade name "ANG790", thickness 0.7 mm, blade tip angle 90° manufacture by Nakayama Co., Ltd.) were pushed to punch out (cut) the foam. The two pieces of blades are fixed in such a state that a 1.8 mm spacer is inserted between them. The cut width was set at 2.5 mm. At two hours after punching, the foam was observed visually or by using a digital microscope and evaluated as in the foregoing "Cutting processability-1".

50% Compression Strain Recovery

A test piece of a sheet-shaped foam (30 mm×30 mm) was compressed to 50% of the original thickness at 23° C. in 50%

RH atmosphere by using two sheets of compression plates and kept at a given temperature (23° C. or 40° C.) for 24 hours. Thereafter, the test piece was released from the compression state. The thickness of the test piece immediately after the release was measured and 50% compression strain recovery of the test piece was calculated according to the following equation.

50% compression strain recovery (%)={1−[thickness of test piece after release (mm)−original thickness of test piece (mm)]/[thickness of test piece at 50% compression (mm)−original thickness of test piece (mm)]×100 processing width can be extremely narrow and the thickness of the product can be selected from the wide range.

The invention claimed is:

1. A process for producing a polyolefin resin foam, which comprises the following steps:
    1. combining a mixture of (A) a rubber, and (B) (B-1) an α-olefin crystalline thermoplastic resin and/or (B-2) an α-olefin amorphous thermoplastic resin, each having a melt tension of less than 3.0 cN in the presence of (C) a crosslinking agent;
    2. dynamically heating the product of step 1;

TABLE 1

| | Example 1 | Example 2 | Example 3 | Example 4 | Example 5 | Example 6 | Example 7 | Comparative Example 1 |
|---|---|---|---|---|---|---|---|---|
| Formulation | | | | | | | | |
| Thermoplastic elastomer composition (i) | 70 | | | | | | | |
| Thermoplastic elastomer composition (ii) | | 93.3 | | | | | | |
| Thermoplastic elastomer composition (iii) | | | 62 | 62 | 50 | 33 | 33 | |
| Thermoplastic elastomer composition (iv) | | | | | | | | 50 |
| Polypropylene | 30 | 39 | 38 | 38 | 50 | 51 | 51 | 50 |
| Lubricant | 10 | 1 | 10 | 0.8 | 1.2 | 10 | 10 | 10 |
| Nucleant agent | 10 | 10 | 10 | 8 | 8.4 | 10 | 10 | 10 |
| Carbon black | | | | 11 | 9.5 | 6 | 6 | |
| Erucamide | | | | | | 2 | | |
| Behenic acid | | | | | | | 2 | |
| Evaluation | | | | | | | | |
| Foam density (g/cm³) | 0.068 | 0.047 | 0.046 | 0.044 | 0.038 | 0.036 | 0.038 | 0.04 |
| Cutting processability-1 | ○ | ○ | ○ | ○ | ○ | ○ | ○ | X |
| Cutting processability-2 | X | X | X | X | X | ○ | ○ | X |
| 50% compression permanent strain recovery (23° C.) | 25.1 | 35.6 | 33.6 | 27.4 | 20.8 | 22.2 | 24.2 | 16.7 |
| 50% compression permanent strain recovery (40° C.) | 8.1 | 12.7 | 13.4 | 7.1 | 9.5 | 7.9 | 8.0 | 3.5 |

As is apparent from Table 1, foams in Examples are excellent in 50% compression strain recovery and cutting processability as compared with the foam in Comparative Example. Further, as shown in Examples 6 and 7, foams obtained by formulating specified aliphatic compounds hardly cause blocking between cell walls. Thus, upon punching processing, cells hardly remain in collapsed state and, therefore, show a desirable processingability in the cutting processability-2 (blade tip angle is 90°) which is a more severe processing test.

While the invention has been described in detail with reference to specific embodiments thereof, it will be apparent to one skilled in the art that various changes and modifications can be made therein without departing from the spirit and scope thereof.

The present application is based on Japanese Patent Application No. 2006-095890 filed on Mar. 30, 2006 and Japanese Patent Application No. 2007-026043 filed on Feb. 5, 2007, the entire contents thereof being incorporated herein by reference.

INDUSTRIAL APPLICABILITY

The polyolefin resin foam according to the present invention is excellent in flexibility and cushioning property and also excellent in processability. Particularly, even the foam has a high foaming magnification, upon punching processing the foam, the cells at the site of punching hardly collapses so that the foam has an improved shape restoration. Thus, the 3. combining the product of step 2 with a second polyolefin resin having a melt tension of 3.0 cN or more at a temperature of 210° C. and at a take-up speed of 2.0 m/min; and a nucleant agent having an average particle diameter of from 0.1 μm to less than 2.0 μm; and
   4. foaming the product of step 3 using carbon dioxide in a supercritical state.

2. The process for producing a polyolefin resin foam according to claim 1, wherein the process further comprises the addition of at least one aliphatic compound selected from an aliphatic acid, an aliphatic acid amide and an aliphatic acid metallic soap, said compound having a polar functional group and a melting point of 50 to 150° C.

3. The process for producing a polyolefin resin foam according to claim 2, wherein the the at least one aliphatic compound is from 1 to 5 parts by mass based on 100 parts by mass of the sum of components (A), (B), (C) and the second polyolefin resin.

4. The process for producing a polyolefin resin foam according to claim 2, wherein the at least one aliphatic compound is an aliphatic acid or an aliphatic acid amide.

5. The process for producing a polyolefin resin foam according to claim 4, wherein the aliphatic acid amide is erucamide.

6. The process for producing a polyolefin resin foam according to claim 1, wherein the polyolefin resin foam has a density of 0.2 g/cm³ or less.

* * * * *